(12) United States Patent
Kim et al.

(10) Patent No.: US 8,941,782 B2
(45) Date of Patent: Jan. 27, 2015

(54) DISPLAY APPARATUS, UPGRADING APPARATUS, DISPLAY SYSTEM AND DATA PROCESSING METHOD OF DISPLAY SYSTEM

(71) Applicant: Samsung Electronics Co., Ltd., Suwon-si (KR)

(72) Inventors: Su-mi Kim, Seoul (KR); Jung-geun Kim, Suwon-si (KR); Ki-nam Kim, Suwon-si (KR); Chang-seog Ko, Hwaseong-si (KR); Jun-sik Choi, Suwon-si (KR); Seung-jun Lee, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 53 days.

(21) Appl. No.: 13/755,566

(22) Filed: Jan. 31, 2013

(65) Prior Publication Data
US 2013/0194502 A1    Aug. 1, 2013

(30) Foreign Application Priority Data

Jan. 31, 2012 (KR) .................. 10-2012-0009579
Jan. 31, 2012 (KR) .................. 10-2012-0009997
Jan. 31, 2012 (KR) .................. 10-2012-0010002
Jan. 31, 2012 (KR) .................. 10-2012-0010085
Aug. 31, 2012 (KR) .................. 10-2012-0096690

(51) Int. Cl.
*H04N 9/12* (2006.01)
*H04N 7/00* (2011.01)
(Continued)

(52) U.S. Cl.
CPC *G09G 5/006* (2013.01); *G06F 8/65* (2013.01); *H04N 21/4183* (2013.01); *H04N 21/4882* (2013.01)

USPC ........ 348/552; 348/553; 348/739; 348/423.1; 348/554; 725/140

(58) Field of Classification Search
USPC .............. 348/552, 553, 554, 423.1, 739; 725/132, 133, 140, 152; 455/3.06
See application file for complete search history.

(56) References Cited

U.S. PATENT DOCUMENTS 6,924,843 B1 * 8/2005 Yamazaki et al. ......... 348/423.1
2004/0093619 A1    5/2004 Cox
(Continued)

FOREIGN PATENT DOCUMENTS

EP    2187306 A1    5/2010
KR    100597270 B1   6/2006
(Continued)

OTHER PUBLICATIONS

"User Manual DM800 HD PVR", Sep. 1, 2008, XP055023699 Retrieved from the Internet: URL:http://www.dream-multimedia-tv.de/download/user_manual_dm800_hd.pdf, Total 110 pages.
(Continued)

*Primary Examiner* — Jefferey Harold
*Assistant Examiner* — Jean W Desir
(74) *Attorney, Agent, or Firm* — Sughrue Mion, PLLC

(57) ABSTRACT

A display system comprising: a display apparatus which comprises a first data processor to perform a first data processing, an output unit to output the processed data, at least one first signal connector to transmit and receive data and a first controller to control the first data processor; and an upgrading apparatus which comprises at least one second signal connector connected to the first signal connector to connect the display apparatus from the outside, a second data processor to perform a second data processing, and a second controller to control the second data processor. The first data processor and the second data processor perform the data processing independently.

41 Claims, 16 Drawing Sheets

(51) Int. Cl.
  *G09G 5/00* (2006.01)
  *G06F 9/445* (2006.01)
  *H04N 21/418* (2011.01)
  *H04N 21/488* (2011.01)

(56) References Cited

U.S. PATENT DOCUMENTS

| | | |
|---|---|---|
| 2007/0220165 A1 | 9/2007 | Moorer et al. |
| 2008/0098450 A1 | 4/2008 | Wu et al. |
| 2008/0285659 A1 | 11/2008 | Raines et al. |
| 2008/0285660 A1 | 11/2008 | Raines et al. |
| 2010/0287594 A1 | 11/2010 | Zhang et al. |
| 2011/0161668 A1 | 6/2011 | Sentinelli et al. |
| 2012/0289147 A1* | 11/2012 | Raleigh et al. ............ 455/3.06 |

FOREIGN PATENT DOCUMENTS

| | | |
|---|---|---|
| WO | 00/62163 A1 | 10/2000 |
| WO | 02/48859 A2 | 6/2002 |

OTHER PUBLICATIONS

Twan: "Nachricht zum dreambox800", Sep. 13, 2009, XP055064230, Internet Retrieved from the Internet: URL:http://www.i-have-a-dreambox.com/wbb2/thread.php?threadid=118206, Total 2 pages.

Dv-Genie: "Bouquets neu laden von der Box aus", Jul. 13, 2009, XP055064234, Internet Retrieved from the Internet: URL:http://www.i-have-a-dreambox.com/wbb2/thread.php?threadid=114454, Total 2 pages.

Communication from the partial European Patent Office issued Jun. 13, 2013 in counterpart European Application No. 13150581.0.

Communication dated Nov. 18, 2013 issued by the European Patent Office in counterpart European Patent Application No. 13150581.0.

Bitmachine, "rTorrent Client für Dreambox DM800 & DM800-Plugins-Newnigma2", Nov. 30, 2009, XP055087417, Retrieved from the Internet: URL:http://board.newnigma2.to/wbb3/index.php?page=Thread&Threadid=5571.

Danijel, "VLC player PC<->DM800-Streaming-Dreamboard", Apr. 11, 2009, XP055087420, Retrieved from the Internet: URL:http://www.dream-multimedia-tv.de/board/index.php?page=Thread&ThreadID=9766.

* cited by examiner

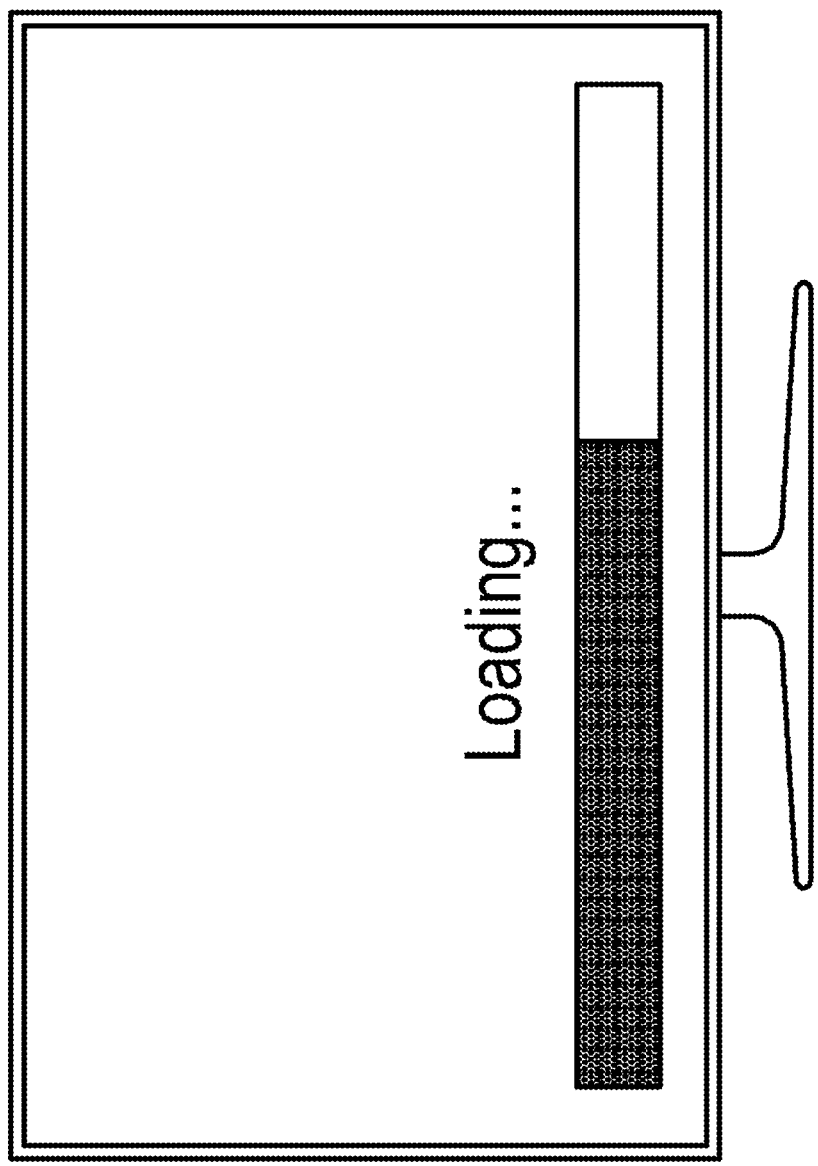

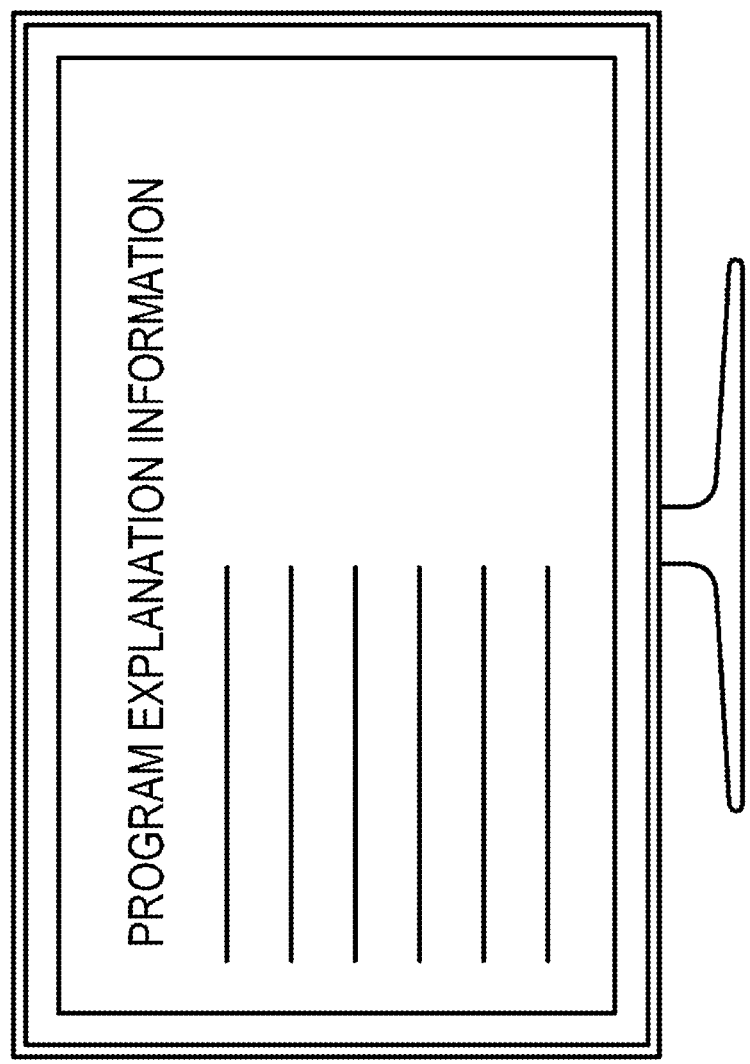

DISPLAY APPARATUS, UPGRADING APPARATUS, DISPLAY SYSTEM AND DATA PROCESSING METHOD OF DISPLAY SYSTEM

CROSS-REFERENCE TO RELATED APPLICATION

This application claims priorities from Korean Patent Applications No. 10-2012-0009579, filed on Jan. 31, 2012, No. 10-2012-0009997, filed on Jan. 31, 2012, No. 10-2012-0010002, filed on Jan. 31, 2012, No. 10-2012-0010085, filed on Jan. 31, 2012 and No. 10-2012-0096690, filed on Aug. 31, 2012 in the Korean Intellectual Property Office, the entire disclosures of which are incorporated herein by reference.

BACKGROUND

1. Field

Apparatuses and methods consistent with the exemplary embodiments relate to a display apparatus, an upgrading apparatus, a display system and a data processing method of the display apparatus, and more particularly, to a display system in which the display apparatus has the upgrading apparatus mounted therein, a data processing method of the display system which simultaneously uses resources of the upgrading apparatus mounted in the display apparatus to upgrade hardware/software and resources of the display apparatus to divide and process data.

2. Description of the Related Art

A display apparatus processes image signals/image data which are supplied by various external signal supply sources or stored therein and displays an image on a display panel based on the processed image signals/image data. The display apparatus which is provided to general users may include a TV or a monitor. For example, the display apparatus which is implemented as a TV processes a broadcasting signal supplied from the outside, through various image processing operations including decoding and scaling operations, and provides an image of a desired broadcasting channel.

The display apparatus has an image processing board built therein which is implemented as a circuit configuration including various chipsets and memories to perform the aforementioned image processing operations.

Over time, the display apparatus needs to be upgraded due to various factors including the development of technology. More specifically, the display apparatus should be upgraded to receive an image signal in a new format which was not offered at the time of manufacturing the display apparatus, or to receive an image signal with resolution that is higher than the level supported by the display apparatus or to reduce system load to the display apparatus.

Improvement of functions of the display apparatus, i.e., upgrading the display apparatus may be conducted via both hardware and software.

With respect to hardware, all or at least a part of the image processing board installed in the display apparatus should physically be replaced to upgrade the display apparatus. With respect to software, the display apparatus requires hardware designed to drive improved software. That is, general users should purchase a new, upgraded display apparatus.

SUMMARY

Accordingly, one or more exemplary embodiments provide a display apparatus, an upgrading apparatus, a display system and a data processing method of the display system which displays application related information while loading an application for execution to thereby enhance a user's convenience.

Another exemplary embodiment is to provide a display apparatus, an upgrading apparatus, a display system and a data processing method of the display system which reduces data processing time by simultaneously using duplicate resources in mounting the upgrading apparatus in the display apparatus to upgrade hardware/software.

Still another exemplary embodiment is to provide a display apparatus, an upgrading apparatus, a display system and a data processing method of the display system which provides upgrading information or application information during an upgrading process of a hub site by simultaneously using resources of the upgrading apparatus and the display apparatus and sharing data processing in mounting the upgrading apparatus in the display apparatus to upgrade hardware/software.

Yet another exemplary embodiment is to provide a display apparatus, an upgrading apparatus, a display system and a data processing method of the display system which overcomes restrictions in using a decoder and provides upgraded functions by performing a decoding operation by using both the upgrading apparatus and the display apparatus in mounting the upgrading apparatus in the display apparatus to upgrade hardware/software.

Yet another exemplary embodiment is to provide a display apparatus, an upgrading apparatus, a display system and a data processing method of the display system which displays a multi-screen by using the upgrading apparatus and the display apparatus in mounting the upgrading apparatus in the display apparatus to upgrade hardware/software.

The foregoing and/or other aspects may be achieved by providing

BRIEF DESCRIPTION OF THE DRAWINGS

The above and/or other aspects will become apparent and more readily appreciated from the following description of the exemplary embodiments, taken in conjunction with the accompanying drawings, in which:

FIGS. 4A and 4B illustrate a screen which is displayed while a program is being loaded;

DETAILED DESCRIPTION OF EXEMPLARY EMBODIMENTS

Figure 1:
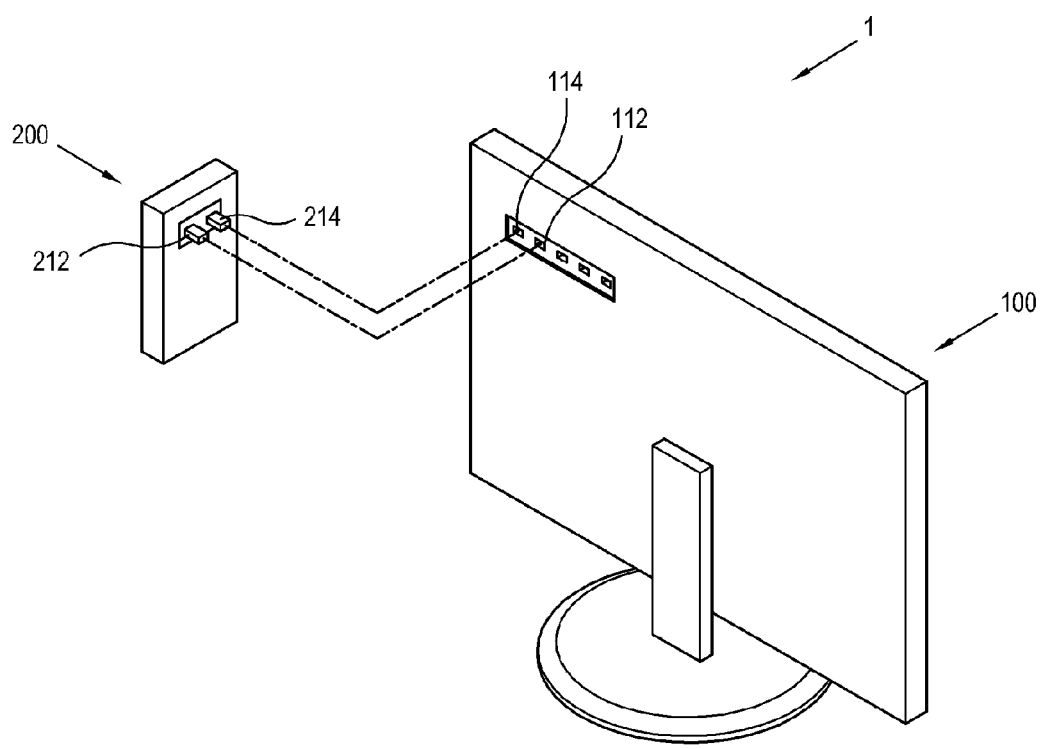
FIG. 1 illustrates an example of a display system according to an exemplary embodiment.

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout.

As shown in FIG. 1, a display system 1 according to an exemplary embodiment includes a display apparatus 100 which processes an image signal supplied by an external signal supply source (not shown), according to a signal processing operation, and displays an image based on the processed image signal, and an upgrading apparatus 200 which upgrades hardware/software of the display apparatus 100.

The display system 1 according to the present exemplary embodiment is implemented as a TV which displays a broadcasting image based on broadcasting signals/broadcasting information/broadcasting data transmitted by transmission equipment of a broadcasting station. However, the concept of the present exemplary embodiment is not limited to the foregoing exemplary embodiment type of the display apparatus 100 and may include various types of embodiments as long as they display an image.

The type of an image which is displayable by the display apparatus 100 is not limited to the broadcasting image, and may include a video, still image, applications, on screen display (OSD), a graphic user interface (GUI) to control various operations, based on signals/data transmitted by various signal supply sources.

According to an exemplary embodiment, the display apparatus 100 may be implemented as a smart TV. The smart TV may receive and display a broadcasting signal in real-time and has a web browser function to display a broadcasting signal in real-time and at the same time enables a user to search and consume various contents, and provides a convenient user environment for the foregoing. The smart TV includes an open software platform and provides a user with interactive service. That is, the smart TV may provide a user with various contents, i.e., an application providing a predetermined service through an open software platform. Such application may include a social networking service (SNS), finance, news, weather, maps, music, movies, games and e-books.

According to the present exemplary embodiment, if the display apparatus 100 is implemented as a smart TV, it may be divided into a first block (not shown) which receives and processes a broadcasting signal and an image signal, and a second block (not shown) which provides an application through an open software platform. The first and second blocks may be divided functionally. The upgrading apparatus 200 may be provided to upgrade the second block of the divided blocks of the display apparatus 100. Accordingly, if the upgrading apparatus 200 is connected to the display apparatus 100, the internet service or application service may be provided by the display apparatus 100 or the upgrading apparatus 200.

The upgrading apparatus 200 is connected to the display apparatus 100 for communication. The upgrading apparatus 200 upgrades existing hardware/software of the connected display apparatus 100 so that the upgraded hardware/software of the display apparatus 100 process an image signal and display an image with improved quality.

The upgrading apparatus 200 may be connected to the display apparatus 100 in a wired/wireless manner. The upgrading apparatus 200 according to the present exemplary embodiment may be connected to the display apparatus 100 in a wired manner to exchange data/information/signals/power with the display apparatus 100. The upgrading apparatus 200 and the display apparatus 100 include connectors/terminals 112, 212, 114 and 214 for mutual physical/electric connection.

The display apparatus 100 may solely process an image signal, which is transmitted from the outside, according to a signal processing operation, and display an image based on the processed image signal. However, the hardware/software of the display system 1 which performs the signal processing operation are upgraded by the connection of the display apparatus 100 and the upgrading apparatus 200, and accordingly, an image with improved quality may be provided.

Figure 2:
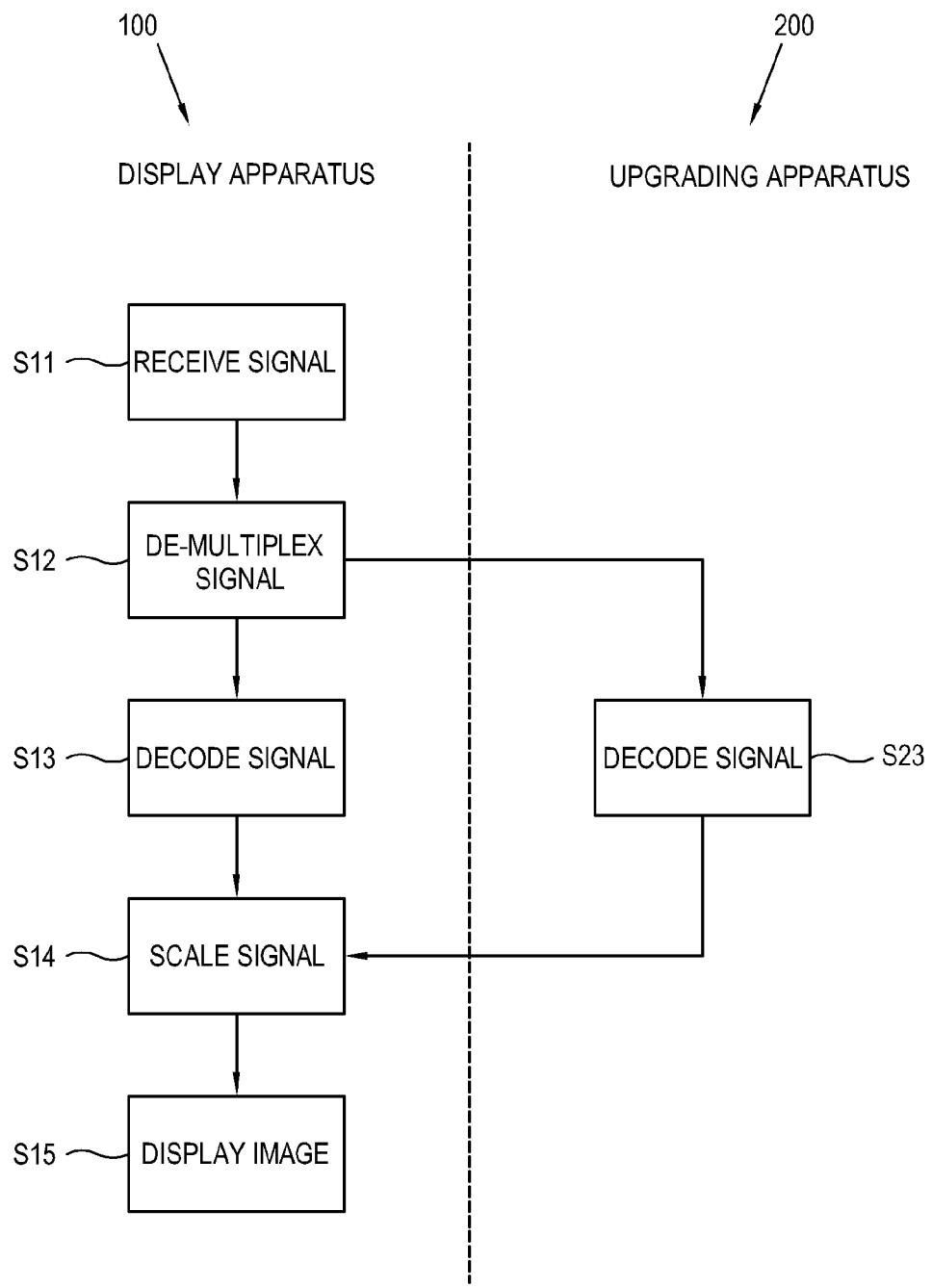
FIG. 2 is a block diagram of a data processing process of the display system in FIG. 1.

Hereinafter, an upgrading process of the display apparatus 100 according to the exemplary embodiment will be described in detail with reference to FIG. 2. FIG. 2 is a flowchart showing a method of upgrading a signal processing operation of the display apparatus 100 by the upgrading apparatus 200 in the display system 1 according to the present exemplary embodiment.

As shown therein, if a signal supply source supplies a predetermined signal, e.g., a broadcasting signal (S11), the display apparatus 100 processes the broadcasting signal according to signal processing operations S12, S13 and S14 in a preset sequence. The signal processing operations S12, S13 and S14 shown in the drawing are examples which are provided to briefly explain the present exemplary embodiment, but do not represent all of image processing operations performed by the display apparatus 100.

The display apparatus 100 performs a de-multiplexing operation to divide the received broadcasting signal into an image signal, an audio signal and additional data (S12). The display apparatus 100 processes the de-multiplexed signal, e.g., decodes the image signal into a preset image format (S13). The display apparatus 100 scales the decoded image signal into a predetermined resolution (S14) and displays an image on the display unit 130 based on the scaled image signal (S15).

In the foregoing sequence, the upgrading apparatus 200 may perform a second data processing S23 corresponding to the first data processing S13 of the display apparatus 100. The second data processing S23 of the upgrading apparatus 200 for decoding the image signal by the upgrading apparatus 200 is the same in an operational aspect as the first data processing S13 of the display apparatus 100, but improved in functionality compared to the first data processing S13 thereof. Thus, performing the second data processing S23 rather than the first data processing S13 may result in improvement of the image processing operation.

For example, the second data processing S23 may process an image signal with resolution that may not be processed by the first data processing S13, process an image signal in a format that may not be processed by the first data processing S13 or apply additional effect to the image signal that may not be done so by the first data processing S13.

Figure 3:
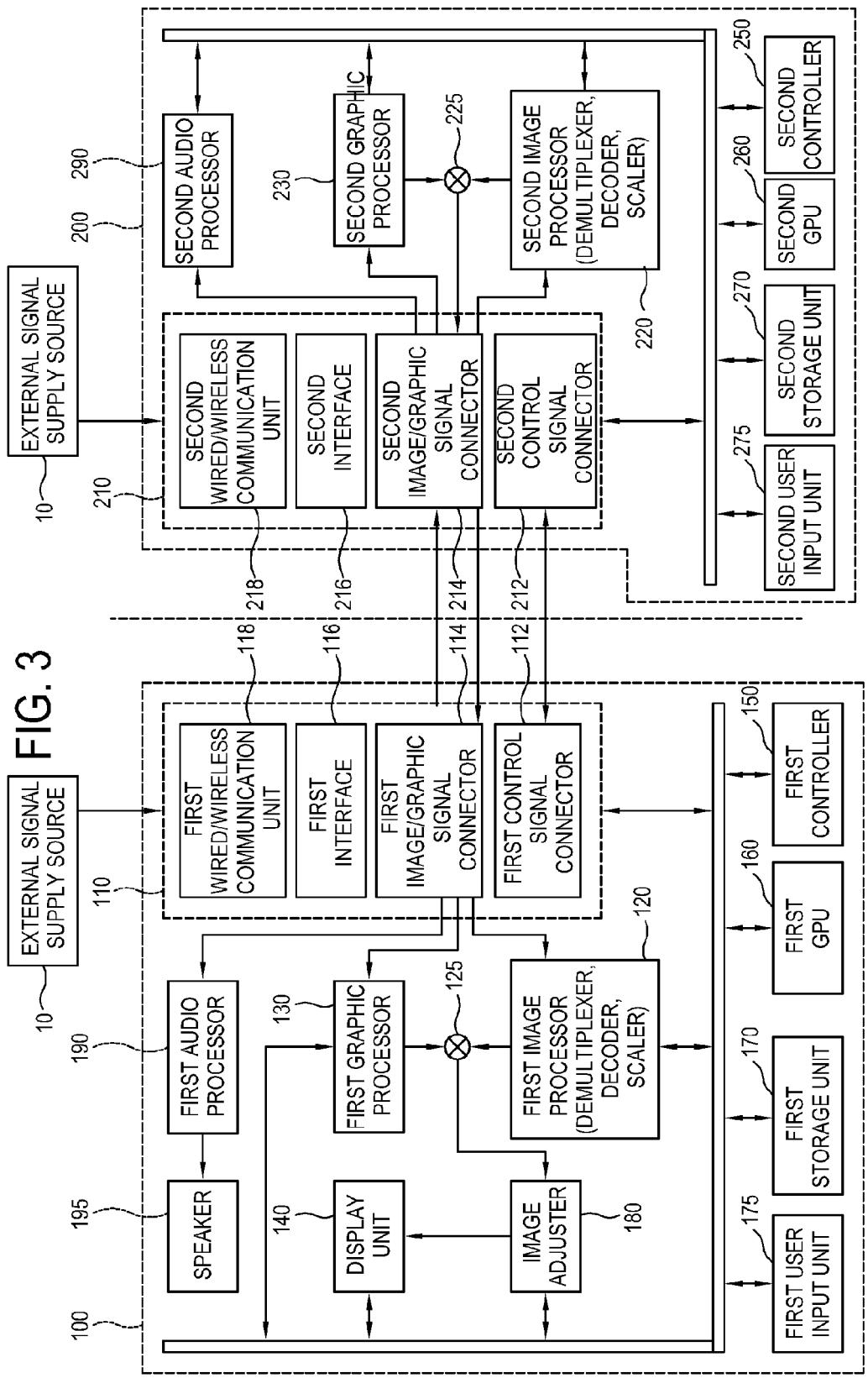
FIG. 3 is a block diagram of a display system according to an exemplary embodiment.

Referring to FIG. 3, the display apparatus 100 and the upgrading apparatus 200 which form the display system 1 according to a first exemplary embodiment will be described in detail.

As shown therein, the display apparatus 100 includes a first signal connector 110 which is connected to at least one upgrading apparatus 200 and receives various image signals from an external signal supply source 10, a first image processor 120 which processes the image signal transmitted through the first signal connector 110, a first graphic processor 130 which generates user interface (UI)/graphics based on the input image, a mixer 125 which overlays and mixes image data processed by the image processor 120 and graphic data generated by the first graphic processor 130, a first graphic controller 160 which controls the first graphic processor 130, a first controller 150 which controls overall operations of the display apparatus 100, an image adjuster 180 which includes a frame rate converter (FRC) to convert an image frame rate before the overlaid and mixed image data and graphic data are displayed on the display unit 140, a first storage unit 170 which stores data therein, the display unit 140 which displays the converted image thereon, a first audio processor 190 which processes an audio signal, a speaker 195 which outputs audio data processed by the first audio processor 190, and a first user input unit 175 which receives input data from a user.

The first signal connector 110 may include a first control signal connector 112 which transmits or receives a control signal to/from the upgrading apparatus 200 (to be described later), a first image/graphic signal connector 114 which exchanges image/graphic signals with the upgrading apparatus 200, a first interface 116 which is used to input various data from the outside and a first wired/wireless communication unit 118.

The first control signal connector 112 may transmit a control signal to the upgrading apparatus 200 to control a second controller of the upgrading apparatus 200 or receive a control signal from the upgrading apparatus 200 to be controlled by the second controller of the upgrading apparatus 200. The first control signal connector 112 may transmit and receive signals/data according to HDMI Ethernet Channel (HEC) standards, but not limited thereto. Alternatively, the first control signal connector 112 may transmit and receive signals/data according to high definition multimedia interface (HDMI), universal serial bus (USB), Component, and low voltage differential signaling (LVDS) standards or may be provided separately as necessary.

The first image/graphic signal connector 114 may exchange signals/data with the upgrading apparatus 200. For example, the first image/graphic signal connector 114 receives signals/data according to HDMI, USB, Component, LVDS and HEC, and includes a plurality of connection terminals (not shown) corresponding to the foregoing standards. As the connection terminals are connected to various external devices including a signal supply source, communication may be performed through the first image/graphic signal connector 114. That is, the external device connected to the first image/graphic signal connector 114 is not limited to the signal supply source, and any device which may exchange signals/data with the display apparatus 100 through the first image/graphic signal connector 114 may be connected to the first image/graphic signal connector 114. Thus, according to the present exemplary embodiment, the upgrading apparatus 200 from the outside may be connected to the first image/graphic signal connector 114.

The first interface 116 may receive signals/data from the outside, e.g., from a cable provider, a set-top box or a personal computer (PC) according to HDMI, USB, Component, LVDS and HEC. The first interface 116 may include a tuner to tune and receive a broadcasting channel. The first interface 116 connects the display apparatus 100 and an external output device (not shown) such as a smart phone, a personal digital assistant (PDA), a laptop computer, or a TV.

The first wired/wireless communication unit 118 may include LOCAL AREA NETWORK (LAN), Wi-Fi, Bluetooth, and Near Field Communication (NFC) to communicate with a PC or a mobile device. The display apparatus 100 may download video files, etc. from the outside through the first wired/wireless communication unit 118.

Image (audio)/graphic signals are transmitted from the outside to the first image processor 120, the first graphic processor 130 and the first audio processor 190 through the first image/graphic signal connector 114, and vary depending on a standard or a received image (audio) signal or embodiment type of the signal supply source and the display apparatus 100. The display apparatus 100 may receive image (audio)/graphic signals from the upgrading apparatus 200 through the first image/graphic signal connector 114 or receive image (audio)/graphic signals directly from the external signal supply source 10.

Image (audio) data and graphic data are transmitted by the upgrading apparatus 200 through the first image/graphic signal connector 114 and act as basis for data processing such as overlay/mixing, frame rate conversion, 2D/3D conversion, mute adjustment and audio conversion and amplification.

Following the data processing, a data processing result may be provided as a feedback to the upgrading apparatus 200 through the first signal connector 110.

The first image/graphic signal connector 114 which receives the image (audio) data and graphic data, and the first image/graphic signal connector 114 which provides the data processing result as a feedback may be different from each other. For example, the first image/graphic signal connector 114 which receives the image (audio) data and graphic data may use an LVDS interface while the first image/graphic signal connector 114 which provides the data processing result may use an HDMI interface.

The first image processor 120 processes an image signal transmitted by the first image/graphic signal connector 114, according to preset various signal processing operations. The first image processor 120 outputs the processed image signal to the display unit 140 to display an image on the display unit 140 based on the image signal.

The first image processor 120 may include, but not limited to, a de-multiplexer to perform a de-multiplexing operation for dividing a predetermined signal by nature, a decoder to perform a decoding operation corresponding to an image format of an image signal, a de-interlacer to perform a de-interlacing operation for converting an interlace image signal into a progressive image signal, a scaler to perform a scaling operation for adjusting an image signal into a preset resolution, a noise buster to perform a noise reduction operation for improving an image quality, a detailer to perform a detail enhancement operation, etc.

The first image processor 120 is implemented as an image processing board (not shown) which is formed by mounting various chipsets (not shown), memories (not shown), electronic parts (not shown), wirings (not shown), etc. on a printed circuit board (PCB) (not shown) to perform the foregoing signal processing operations.

The first graphic processor 130 may generate various user interfaces (UIs) and graphics based on an input image or input data.

The first graphic controller (GPU) 160 controls the first graphic processor 130. The first graphic processor 130 is formed by a single board, and the first GPU 160 as at least one chipset may be mounted in a graphic board or integrated into a central processing unit (CPU) to control the first graphic processor 130.

The mixer 125 overlays and mixes subtitle data to image data, and mixes audio and image.

The image adjuster 180 adjusts data into a suitable form to display an image on the display unit 140, and may include a frame rate converter (FRC) for converting a frame rate of image data to express a fast motion, a 2D/3D converter, and a mute adjuster.

The display unit 140 displays an image thereon based on an image signal output by the first image processor 120. The display unit 140 may be implemented as various display panels including liquid crystal, plasma, light-emitting diode (LED), organic light-emitting diode (OLED), surface-conduction electron-emitter, carbon nano-tube, and nano-crystal, but not limited thereto.

The display unit 140 may further include additional elements depending on its implementation type. For example, the display unit 140 as an LCD type may include an LCD panel (not shown), a backlight unit (not shown) to emit light to the LCD panel, and a panel driving substrate (not shown) to drive the LCD panel (not shown).

The first controller 150 controls various elements of the display apparatus 100. For example, the first controller 150 controls the first image processor 120 to process signals, controls the first signal connector 110 to exchange signals/information/data, and performs a control operation in response to a command of a user input unit (not shown) to thereby control entire operations of the display apparatus 100.

The first storage unit 170 stores therein unlimited data. The first storage unit 170 is implemented as a non-volatile memory such as a flash memory or a hard disc drive.

The first storage unit 170 is accessed by the first controller 150, and data stored therein may be read/recorded/modified/deleted/updated by the first controller 150.

The data which are stored in the first storage unit 170 include an operating system (OS), various applications which are executed on the OS, device information regarding the display apparatus 100 and the upgrading apparatus 200, image data, and additional data.

The display apparatus 100 may further include the audio processor 190 which converts and amplifies an audio signal divided by the first image processor 120, in a predetermined format, and the speaker 195 which outputs the amplified audio signal.

The display apparatus 100 may further include the user input unit 175 which outputs a preset command according to a user's manipulation. The user input unit 175 transmits preset various control commands or unlimited information to the first controller 150 by a user's manipulation and input. The user input unit 175 may be implemented as a menu key and an input panel installed in an external part of the display apparatus 100, or a remote controller which is separated/spaced from the display apparatus 100. The user input unit 175 may communicate with the display apparatus 100 through NFC such as Bluetooth or infrared communication. In this case, the user input unit 175 may include a wireless keyboard and a wireless mouse as well as the remote controller. As the case may be, the user input unit 175 may be integrally formed in the display unit 140. That is, if the display unit 140 includes a touch screen, a user may transmit a preset command to the first controller 150 through an input menu (not shown) displayed on the display unit 140.

According to the first embodiment, the upgrading apparatus 200 which upgrades the display apparatus 100 is connected to the first image/graphic signal connector 114 and upgrades at least one of existing hardware and software configurations of the display apparatus 100.

The upgrading apparatus 200 includes hardware/software configurations corresponding to at least a part of hardware/software resources of the display apparatus 100. The configurations of the upgrading apparatus 200 may perform an improved function compared to the at least a part of the resources of the display apparatus 100. Upon connection to the display apparatus 100, the upgrading apparatus 200 replaces at least a portion of existing resources of the display apparatus 100 or independently performs data processing at the same time to ultimately improve quality of an image displayed by the display apparatus 100.

Hereinafter, a configuration of the upgrading apparatus 200 will be described with reference to FIG. 3.

The upgrading apparatus 200 includes a second image/graphic signal connector 214 which is connected to the first image/graphic signal connector 114 of the display apparatus 100, a second image processor 220 which performs operations corresponding to at least a portion of the image processing operations of the first image processor 120, a second graphic processor 230 which generates graphics/UIs with respect to image information, a second GPU 260 which controls operations of the second graphic processor 230, a second storage unit 270 which stores data therein, a second controller 250 which controls overall operations of the upgrading apparatus 200, a second audio processor 290 which processes an audio signal, and a second user input unit 275 which receives input data from a user.

The second signal connector 210 may include a second control signal connector 212 which transmits or receives a control signal to/from the display apparatus 100, a second image/graphic signal connector 214 which exchanges image (audio)/graphic signals with the display apparatus 100, a second interface 216 which is used to input various data from the outside, and a second wired/wireless communication unit 218.

The second control signal connector 212 may be connected to, and transmit a control signal to, the first control signal connector 112 of the display apparatus 100 to control the first controller 150 of the display apparatus 100, or receive a control signal from the display apparatus 100 to be controlled by the first controller 150 of the display apparatus 100. The second control signal connector 212 may transmit and receive signals/data according to HEC standards, but not limited thereto. Alternatively, the second control signal connector 212 may transmit and receive signals/data according to HDMI, USB, Component, and LVDS standards or may be provided separately as necessary.

The second image/graphic signal connector 214 may exchange signals/data with the display apparatus 100. For example, the second image/graphic signal connector 214 may receive signals/data according to HDMI, USB, Component, LVDS and HEC, and includes a plurality of connection terminals (not shown) corresponding to the foregoing standards. As the connection terminals are connected to various external devices including a signal supply source, communication may be performed through the second image/graphic signal connector 214. That is, the external device connected to the second image/graphic signal connector 214 is not limited to the signal supply source, and any device which may exchange signals/data with the display apparatus 100 through the second image/graphic signal connector 214 may be connected to the second image/graphic signal connector 214. Thus, according to the present embodiment, the display apparatus 100 may be connected to the second image/graphic signal connector 214.

The second interface 216 may receive signals/data from the outside, e.g., from a cable provider, a set-top box or a PC according to HDMI, USB, Component, LVDS and HEC. The second interface 216 may include a tuner to tune and receive a broadcasting channel. The second interface 216 connects the upgrading apparatus 200 and an external output device (not shown) such as a smart phone, a PDA, a laptop computer or a TV.

The second wired/wireless communication unit 218 may include a wireless Internet module, an NFC module, a LOCAL AREA NETWORK (LAN) module, and a USB module. The upgrading apparatus 200 may download various file data such as video from the outside through the second wired/wireless communication unit 218.

The wireless Internet module connects the upgrading apparatus 200 to the Internet through at least one of wireless LOCAL AREA NETWORK (LAN), Wi-Fi, Wibro and Long Term Evolution (LTE).

The NFC module enables communication between an external device and the upgrading apparatus 200 by Bluetooth and Infrared Data Association (IrDA) protocol. The external device may include a user input device such as a mouse, a keyboard and a remote controller and an audio output device such as an earphone and a speaker. As the case may be, the external device may include a portable electronic device such as a smartphone, a personal digital assistant (PDA) and a laptop computer.

The LOCAL AREA NETWORK (LAN) module connects the upgrading apparatus 200 to a wired Internet network by a cable such as Ethernet Network Interface Card (NIC).

The USB hub may include at least one USB port, and a USB host controller for controlling data input/output with respect to an external device connected to the USB port.

The input external signal includes at least one of an image signal, a broadcasting signal, an external control signal and other signals which are needed directly or indirectly to extend or improve functions of the display apparatus 100.

The upgrading apparatus 200 may include various external signal input units to convert an input external signal and provide the signal to the display apparatus 100 to thereby enhance extensibility of the display apparatus 100. That is, such extensibility of the display apparatus 100 is enhanced as the upgrading apparatus 200 processes various external signals which are not processed by the display apparatus 100 and provides the external signals to the display unit 140.

The second signal connector 210 is connected to the first signal connector 110 to enable communication between the upgrading apparatus 200 and the display apparatus 100. The second signal connector 210 complies with standards corresponding to the first signal connector 110, so as to be connected to the first signal connector 110. The second signal connector 210 may be connected to at least one of a plurality of connection terminals (not shown) of the first signal connector 110.

The upgrading apparatus 200 may transmit the processed image data and graphic data to the display apparatus 100 through the second signal connector 214. In addition, the received image signal/graphic signal may be transmitted through the second image/graphic signal connector 214 to, and processed by, the display apparatus 100 rather than by the upgrading apparatus 200. The image (audio)/graphic data which have been processed by the upgrading apparatus 200 may be transmitted to a portable electronic device such as a smart phone, a PDA or a laptop computer other than the display apparatus 100.

The second image/graphic signal connector 214 which transmits the image (audio) data and graphic data, and the second image/graphic signal connector 214 which receives the data processing result as a feedback may use different lines. For example, the second image/graphic signal connector 214 which transmits the image data and graphic data may use an LVDS interface while the second image/graphic signal connector 214 which receives the data processing result may use an HDMI interface.

The second image processor 220 may include, but is not limited to, a de-multiplexer to perform a de-multiplexing operation for dividing a predetermined signal by nature, a decoder to perform a decoding operation corresponding to an image format of an image signal, a de-interlacer to perform a de-interlacing operation for converting an interlace image signal into a progressive image signal, a scaler to perform a scaling operation for adjusting an image signal into a preset resolution, a noise buster to perform a noise reduction operation for improving an image quality, a detailer to perform a detail enhancement operation, etc.

The second image processor 220 may perform a second data processing corresponding to at least a portion of the first data processing of the first image processor 120 of the display apparatus 100. The first data processing and second data processing are named for distinction purposes only, and may include a single data processing or a plurality of unit data processing. The second data processing is improved in functionality compared to the first data processing and this is realized by improvement of hardware such as chipsets or improvement of software such as algorithms/execution codes/programs.

The second image processor 220 may perform the second data processing instead of the first data processing or perform the first data processing and the second data processing simultaneously, according to a control of the first controller 150 or the second controller 250, if the display apparatus 100 and the upgrading apparatus 200 are connected to each other. As the data processing is performed, the second data processing which is improved in functionality compared to the first data processing may replace the first data processing, or the first data processing and second data processing may be simultaneously performed, resulting in improvement of efficiency in the signal processing operation.

For example, a full HD image which may not be provided by the first image processor 120 may be provided by the second image processor 220. Also, a 3D screen may be implemented through the second image processor 220 instead of the first image processor 120 which may not provide the 3D screen. Such added and extended function is an example and may vary.

The second image processor 220 may reprocess the audio signal as well as the image signal, and the reprocessed and upgraded audio signal may be provided to the display apparatus 100.

The second controller 250 controls a connection operation between the display apparatus 100 and the upgrading apparatus 200 to upgrade the entire signal processing. The second controller 250 and the first controller 150 may be implemented as a CPU. If the second controller 250 may perform an improved function compared to the first controller 150, the second controller 250 rather than the first controller 150 may disable the first controller 150 and control the entire operations of the display system 1.

The second controller 250 may control the entire operations of the display system 1 together with the first controller 150. That is, the second controller 250 may transmit a control signal to the display apparatus 100 through the first and second control signal connectors 112 and 212 and control the first controller 150. Upon receiving a control signal from the upgrading apparatus 200, the first controller 150 may transmit a set of instructions to the upgrading apparatus 200 to enable the second controller 250 to control elements of the display apparatus 100 through the first controller 150. The elements of the display apparatus 100 may include at least one of the first image processor 120, the first graphic processor 130, the mixer 125, and the image adjuster 180.

It has been explained that the second controller 250 controls the first controller 150, and on the contrary, the first controller 150 may control the second controller 250. Upon receiving a control signal from the display apparatus 100, the second controller 250 may transmit a set of instructions to the display apparatus 100 and the first controller 150 may control elements of the upgrading apparatus 200. The elements of the upgrading apparatus 200 may include the second image processor 220, the second graphic processor 230, and a second mixer 225 (refer to FIG. 9).

The second graphic processor 230 may generate various UIs and graphics based on input image information or input graphic data.

The second GPU 260 controls the second graphic processor 230. The second graphic processor 230 is formed by a single board, and the second GPU 260 as at least one chipset may be mounted in a graphic board or integrated into a CPU to control the second graphic processor 230.

As the case may be, the upgrading apparatus 200 may further include a power converter (not shown) to convert power supplied by the display apparatus 100, into power necessary for its operation. If the display apparatus 100 converts and transmits all power as required by the upgrading apparatus 200, the power converter may be omitted.

As the case may be, the upgrading apparatus 200 may receive driving power as needed for its operation, from the display apparatus 100 through a USB. In addition, the upgrading apparatus 200 may receive additional external power (commercial power or battery).

The display apparatus 100 and the upgrading apparatus 200 of the display system 1 according to the exemplary embodiment may perform the first data processing and second data processing, respectively. As the display apparatus 100 and the upgrading apparatus 200 may independently perform data processing, they may utilize resources of the display apparatus 100 and the upgrading apparatus 200 as necessary. Duplicate elements of the display apparatus 100 and the upgrading apparatus 200 are different in performance, but if such difference can be ignored, the display apparatus 100 and the upgrading apparatus 200 may utilize all of such duplicate elements and perform efficient data processing independently.

The display apparatus 100 and the upgrading apparatus 200 according to the exemplary embodiment may perform different data processing as well as the data processing by utilizing the duplicate elements, to thereby provide a convenience to the user. For example, while the upgrading apparatus 200 upgrades a hub site, the display apparatus 100 may provide a user with upgrading information, music and advertisement broadcasting.

Hereinafter, a data processing method for efficiently using resources of the display apparatus 100 and the upgrading apparatus 200 in the display system 1 according to the exemplary embodiment will be described in detail with reference to FIGS. 4 to 15.

For example, to upgrade a hub site of a smart TV or update a program, the second controller 250 upgrades the hub site or updates the program and the display apparatus 100 only displays the word "Loading" in an OSD since the image signal is transmitted until the upgrading or update is completed.

FIG. 4A illustrates a loading screen for executing an application displayed in a conventional display apparatus.

FIG. 4B illustrates a loading screen for executing an application in the display apparatus according to an exemplary embodiment.

Referring to FIG. 4A, if a user requests the execution of the application stored in the conventional display apparatus, the display apparatus loads the selected application for execution. The conventional display apparatus shows a loading progress through a loading bar. If the loading time of the application is considerably longer, or there is a mistake or error in loading the application, the loading bar is shown for a considerable time, causing a user to feel upset or feel as if an OS of the display apparatus is not operating.

To resolve such inconvenience, the display apparatus 100 and the upgrading apparatus 200 of the display system 1 according to the exemplary embodiment do not show the loading bar but display information of the application during the loading process to thereby provide useful service.

Figure 5:
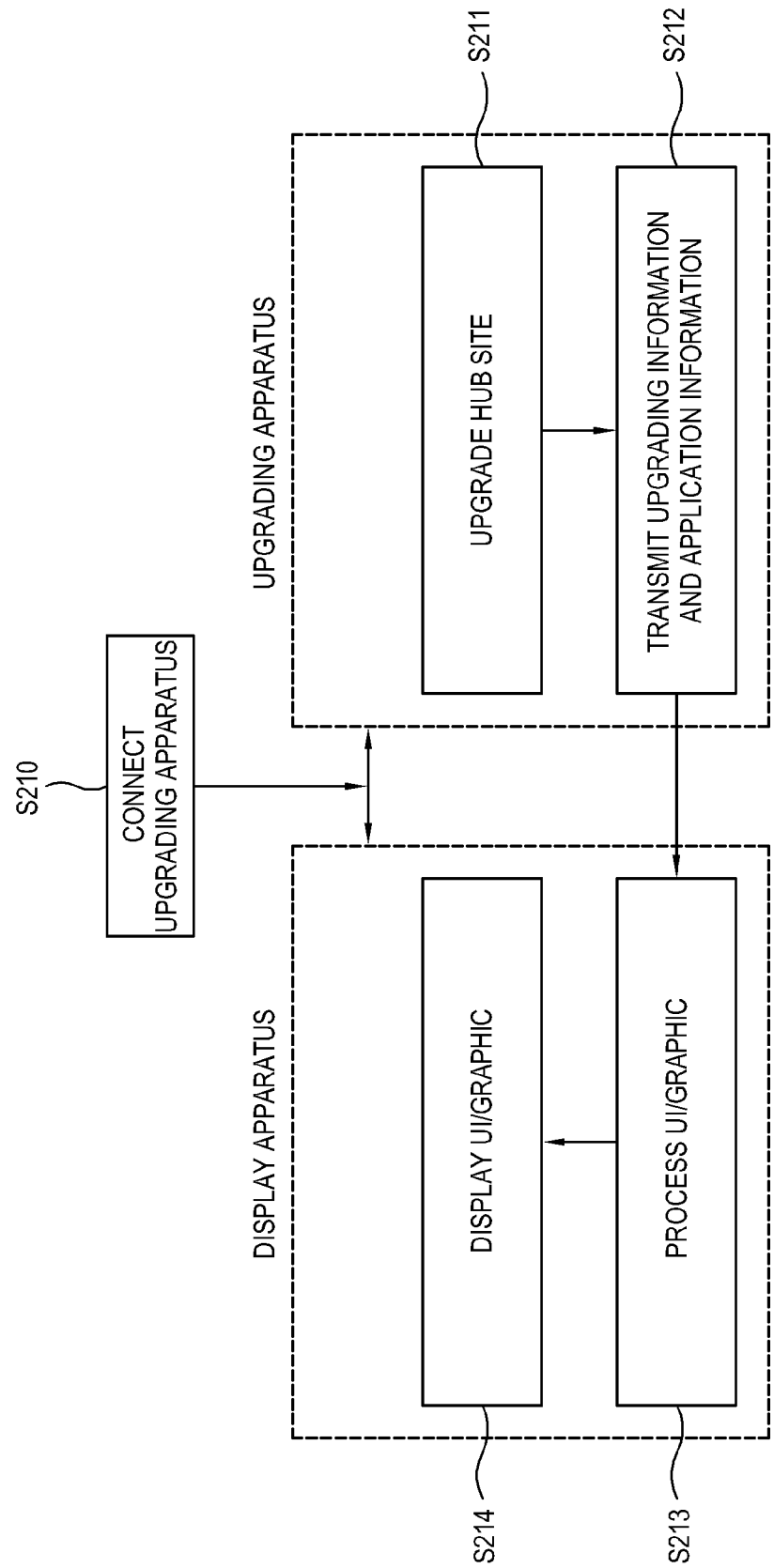
FIGS. 5 to 14 are flowcharts showing a data processing method of the display apparatus according to exemplary embodiments.

FIG. 5 illustrates a process of dividing and processing graphics such as upgrading information, application information and advertisement screen by using resources of the display apparatus 100 and the upgrading 200 during upgrading of a hub site.

In FIG. 5, if the upgrading apparatus 200 is connected to the display apparatus 100 (S210), the upgrading apparatus 200 upgrades a hub site (S211), and transmits upgrading information, application information and advertisement information to the display apparatus 100 (S212). During the upgrading of the hub site by the upgrading apparatus 200, the display apparatus 100 generates graphics based on the upgrading information, application information and advertisement information (S213) and displays the graphics on the display unit (S214).

In a conventional art, a loading OSD is shown to notify a user that he/she should wait until the upgrading of the hub site is completed. However, in the present exemplary embodiment, during the upgrading of the hub site by the upgrading apparatus 200, the display apparatus 100 generates graphics such as the upgrading information, application information and advertisement screen and provide a user with such information. The upgrading apparatus 200 may upgrade the hub site and at the same time the display apparatus 100 may display the program information, independently.

Figure 6:
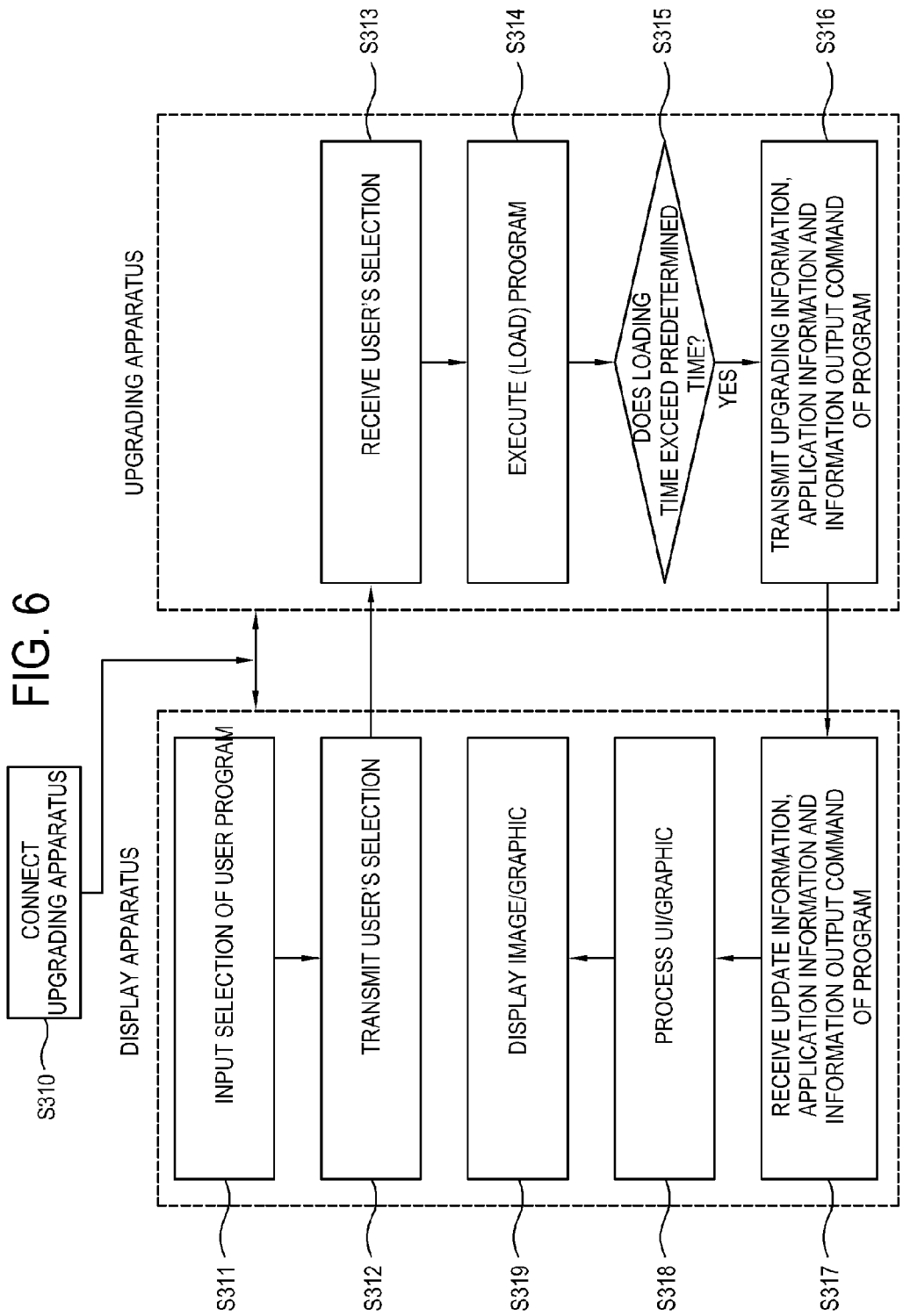

FIG. 6 illustrates data processing when a loading time is as long as an update of a particular program.

If the upgrading apparatus 200 is connected to the display apparatus 100 according to the exemplary embodiment, a user may execute an application stored in the display apparatus 100 or the upgrading apparatus 200.

If a user's selection is transmitted through the first and second user input units 175 and 275 to request for an execution of a predetermined application, information of the application is displayed on the display unit 140, simultaneously loading the application for execution. The information of the application and the loading progress may be displayed altogether. The information of the application includes at least one of application explanation information, setting information, version information and key guide information of the application. Thus, before the execution screen of the application is displayed, a user may recognize the application and feel more convenient.

Referring to FIG. 6, the upgrading apparatus 200 which includes a second storage unit 270 storing therein at least one program for performing a predetermined function and information of the program, is connected to the display apparatus 100 (S310). If a user's selection is input through the first user input unit 175 to request an execution of a program stored in the second storage unit 270 of the upgrading apparatus 200 (S311), the first controller 150 of the display apparatus 100 transmits the user's selection to the upgrading apparatus 200 (S312). The upgrading apparatus 200 receives information of the program selected by a user, corresponding to the transmission of the user's selection (S313). The upgrading apparatus 200 executes (loads) the program selected by a user (S314).

The upgrading apparatus 200 determines whether the program execution time, i.e., loading time, exceeds a predetermined time (S315). That is, the upgrading apparatus 200 determines whether there is any image signal corresponding to the executed program (S315).

If the program loading time does not exceed predetermined time, i.e., if an image signal is output, the image signal is transmitted to the display apparatus 100 and output to the display unit 140.

If the program loading time exceeds a predetermined time, i.e., if an image signal is not output during a predetermined time, update information, and application information of the program and an information output command are transmitted to the display apparatus 100 (S316).

The display apparatus 100 receives the update information and application information of the program and the information output command (S317), and processes UIs/graphics of the received information (S318). The display unit 140 outputs the processed UIs/graphics (S319).

In FIG. 6, the upgrading apparatus 200 determines whether the program loading time exceeds the predetermined time, but such determination may be made by the display apparatus 100. If the program loading time exceeds the predetermined time, the upgrading apparatus 200 may transmit only the information output command to the display apparatus 100. It has been assumed that the display apparatus 100 recognizes the information to be output. If the information of the program has been received directly by the upgrading apparatus 200 not via the display apparatus 100, the information of the program may be transmitted together with the information output command.

The information displayed on the display unit 140 during the loading of the program of the upgrading apparatus 200 may include at least one of program explanation information, setting information, version information and key guide information of the program.

Figure 7:
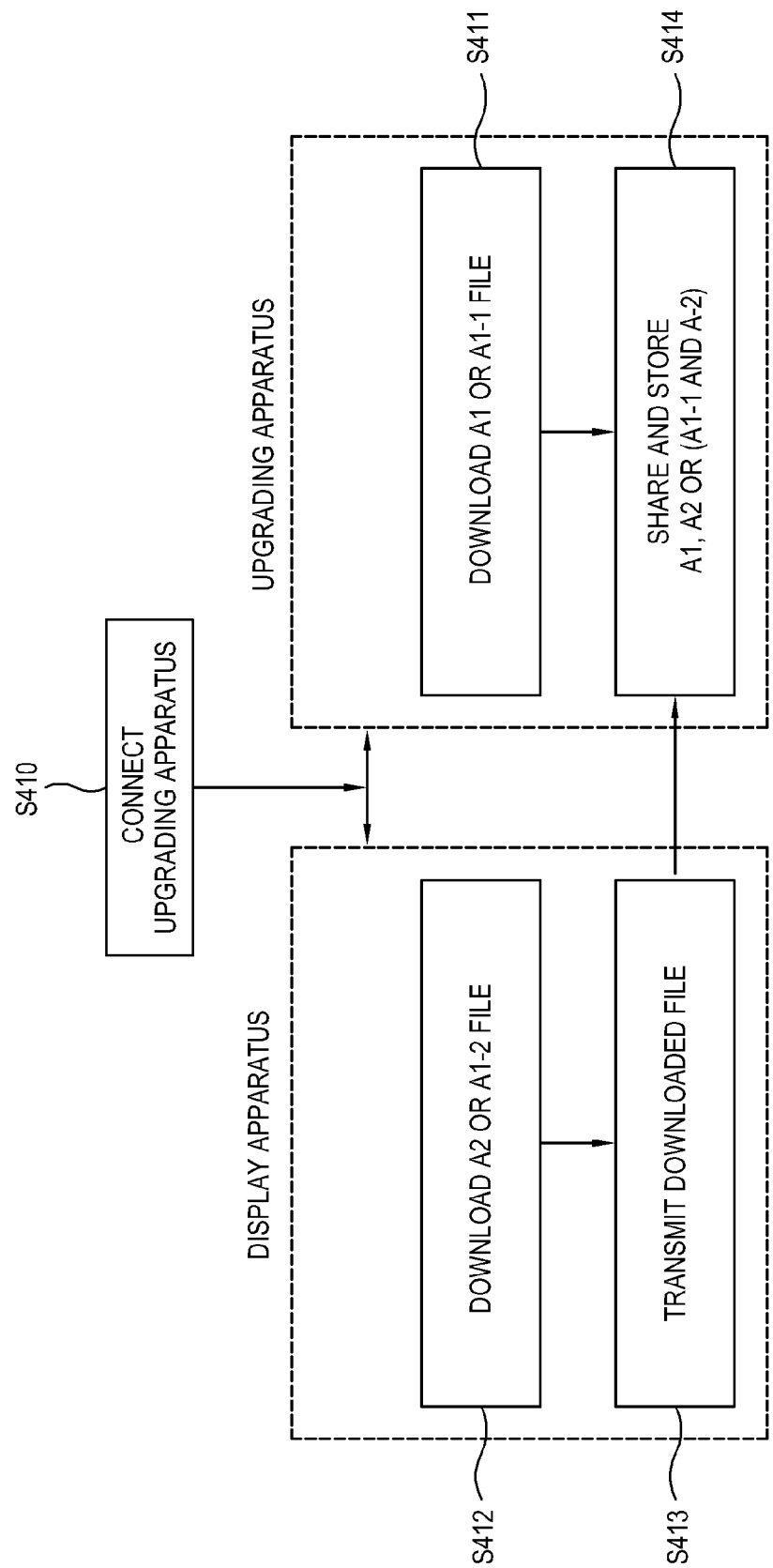

FIG. 7 illustrates a process of dividing and downloading file data in a VIDEO ON DEMAND (VOD) service by using resources of the display apparatus 100 and the upgrading apparatus 200.

In FIG. 7, if the upgrading apparatus 200 is connected to the display apparatus 100 (S410), the upgrading apparatus 200 downloads one file data A1 of two file data A1 and A2 through the second wired/wireless communication unit 218 (S411), and the display apparatus 100 downloads the other one file data A2 of the two file data A1 and A2 through the first wired/wireless communication unit 118 (S412). The display apparatus 100 transmits the downloaded file data A2 to the upgrading apparatus 200 (S413), and the upgrading apparatus 200 stores the transmitted downloaded file data A2 together with its file data A2 and shares the file data A1 and A2 (S414).

In FIG. 7, if the upgrading apparatus 200 is connected to the display apparatus 100 (S410), the upgrading apparatus 200 downloads partial file data A-1 of one file data A-1+A-2 (S411), the display apparatus 100 downloads the other partial file data A-2 of the file data A-1+A-2 (S412). The display apparatus 100 transmits the downloaded file data A-2 to the upgrading apparatus 100 (S413), and the upgrading apparatus 200 integrates the transmitted downloaded file data A-2 into its downloaded file data A-1 and stores and shares the integrated file data (S414). To divide and download one file A, the display apparatus 100 and the upgrading apparatus 200 should know the information of the file structure (A=A-1+A-2).

If the file data are divided and processed by the display apparatus 100 and the upgrading apparatus 200, the downloading time may be reduced.

Figure 8:
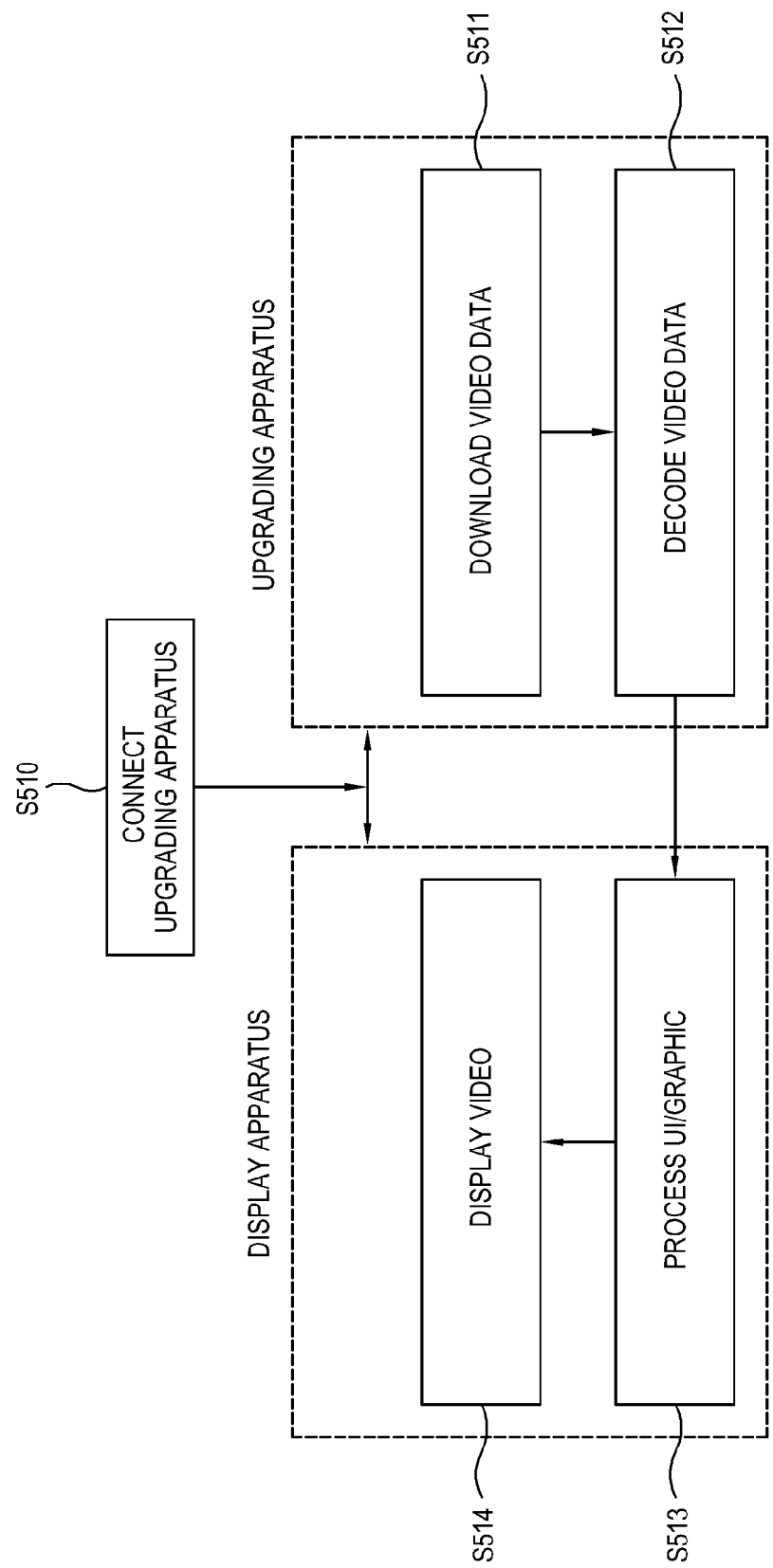

FIG. 8 illustrates a process or dividing and performing video processing and graphic processing by using resources of the display apparatus 100 and the upgrading apparatus 200.

In FIG. 8, if the upgrading apparatus 200 is connected to the display apparatus 100 (S510), the upgrading apparatus 200 downloads (S511) and decodes (S512) the video data, and the display apparatus 100 processes UIs/graphics based on the video information, generates UI/graphic data (S513) and displays a video (S514).

As the display apparatus 100 and the upgrading apparatus 200 may divide and perform the video processing and graphic processing, data processing speed may be increased and seamless video may be played.

Figure 9:
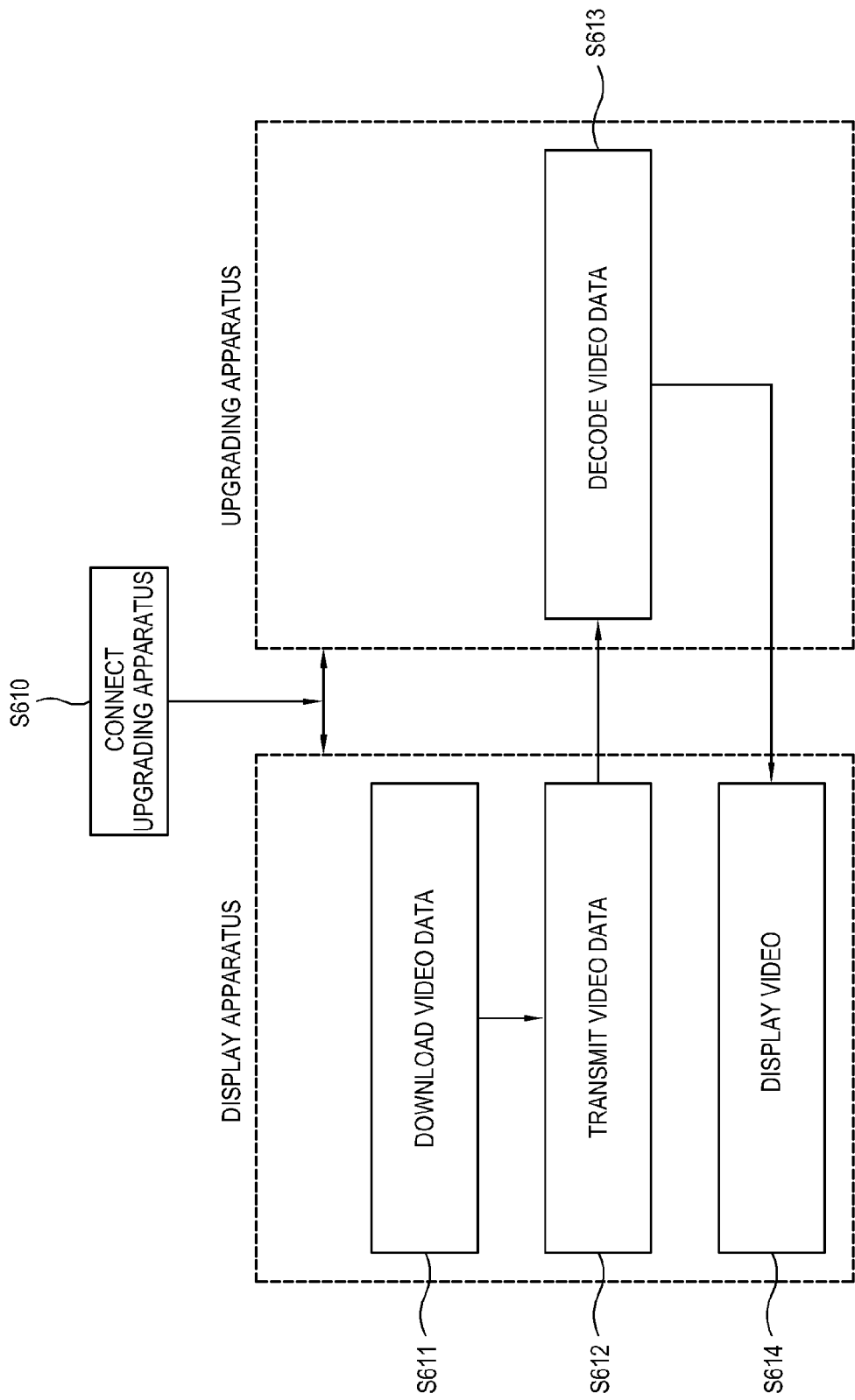

FIG. 9 illustrates a process of dividing and performing video data decoding for downloading and playing the video data in a streaming service by using resources of the display apparatus 100 and the upgrading apparatus 200.

In FIG. 9, if the upgrading apparatus 200 is connected to the display apparatus 100 (S610), the display apparatus 100 downloads the video data (S611), and transmits the downloaded data to the upgrading apparatus 200 (S612). The upgrading apparatus 200 decodes the downloaded video data for playing (S613), and transmits the video data to the display apparatus 100 and displays a video (S614).

As the decoding operation is divided and performed for downloading and playing a video of the streaming service in which the video data are downloaded and played in real-time, buffering time is minimized and a user may feel satisfied.

Figure 10:
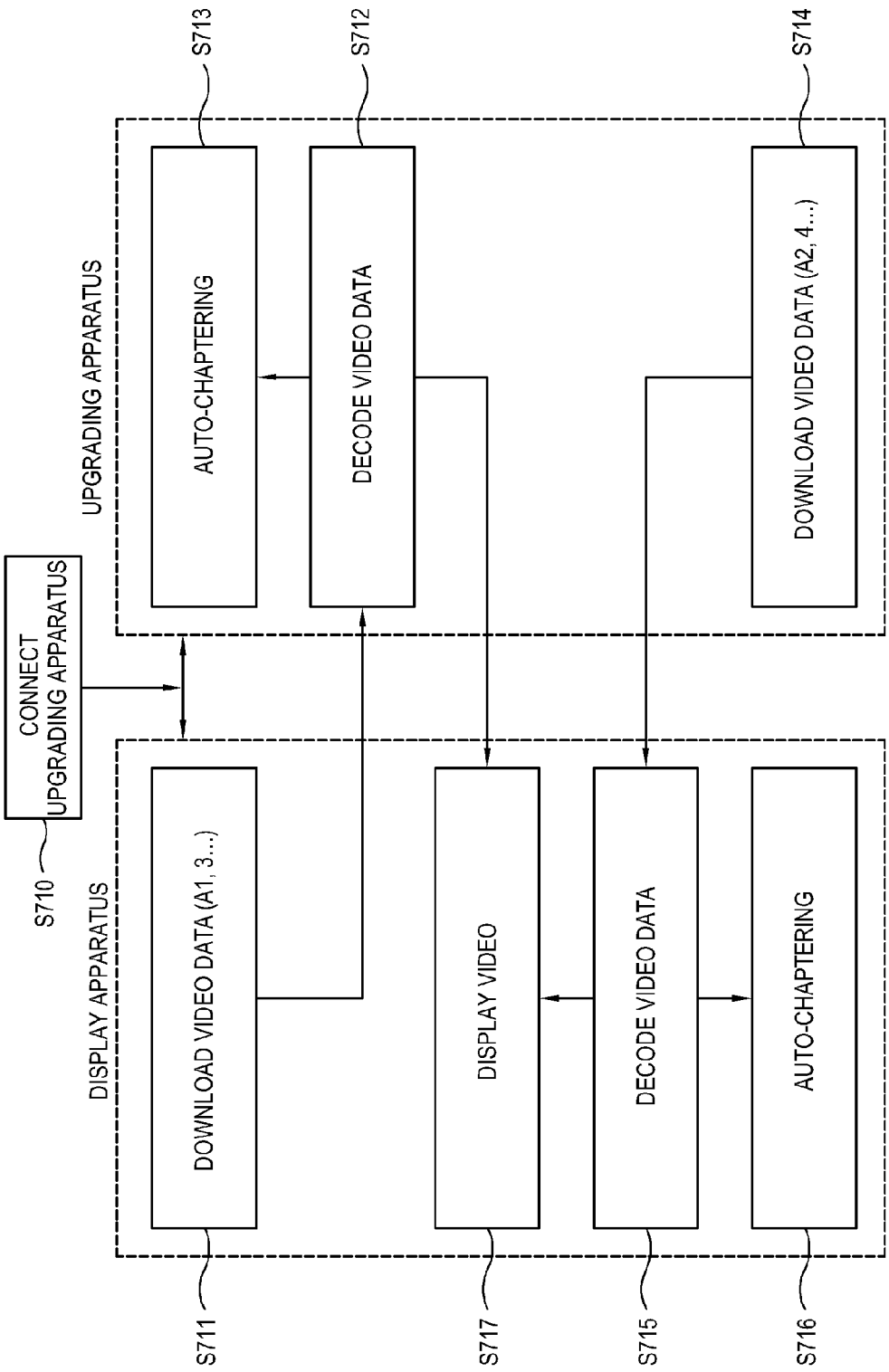

FIG. 10 illustrates a process of alternately dividing and decoding video data of a streaming service by the display apparatus 100 and the upgrading apparatus 200 for downloading and playing the video data, by using resources of the display apparatus 100 and the upgrading apparatus 200.

In FIG. 10, if the upgrading apparatus 200 is connected to the display apparatus 100 (S710), the display apparatus 100 downloads video data A1, 3, . . . in an odd number section (S711), and the upgrading apparatus 200 decodes the downloaded video data A1, 3 . . . in the odd number section (S712).

The decoded video data are divided into a plurality of chapters by index with respect to the odd number section and the chapter information may be displayed in the video data (S713).

While the display apparatus 100 downloads the video data A1, 3, . . . in the odd number section, the upgrading apparatus 200 downloads video data A2, 4, . . . in an even number section (S714) and the display apparatus 100 decodes the downloaded video data A2, 4, . . . in the even number section (S715). The decoded video data are divided into a plurality of chapters by index with respect to the even number section, and the chapter information may be displayed in the video data (S716).

When the display apparatus 100 downloads the video data A1 in the odd number section, the upgrading apparatus 200 downloads the video data A2 in the even number section. When the upgrading apparatus 200 decodes the video data A1, the display apparatus 100 decodes the video data A2.

The display apparatus 100 and the upgrading apparatus 200 may alternately download and decode the video data in the streaming service, and when the display apparatus 100 decodes the video data for playing, the upgrading apparatus 200 may download the next playing part, thereby dividing and processing the video data by the display apparatus 100 and the upgrading apparatus 200. According to the exemplary embodiment, even in the streaming service which does not support auto-chaptering during an encoding process, the auto-chaptering function may be performed by index.

Figure 11:
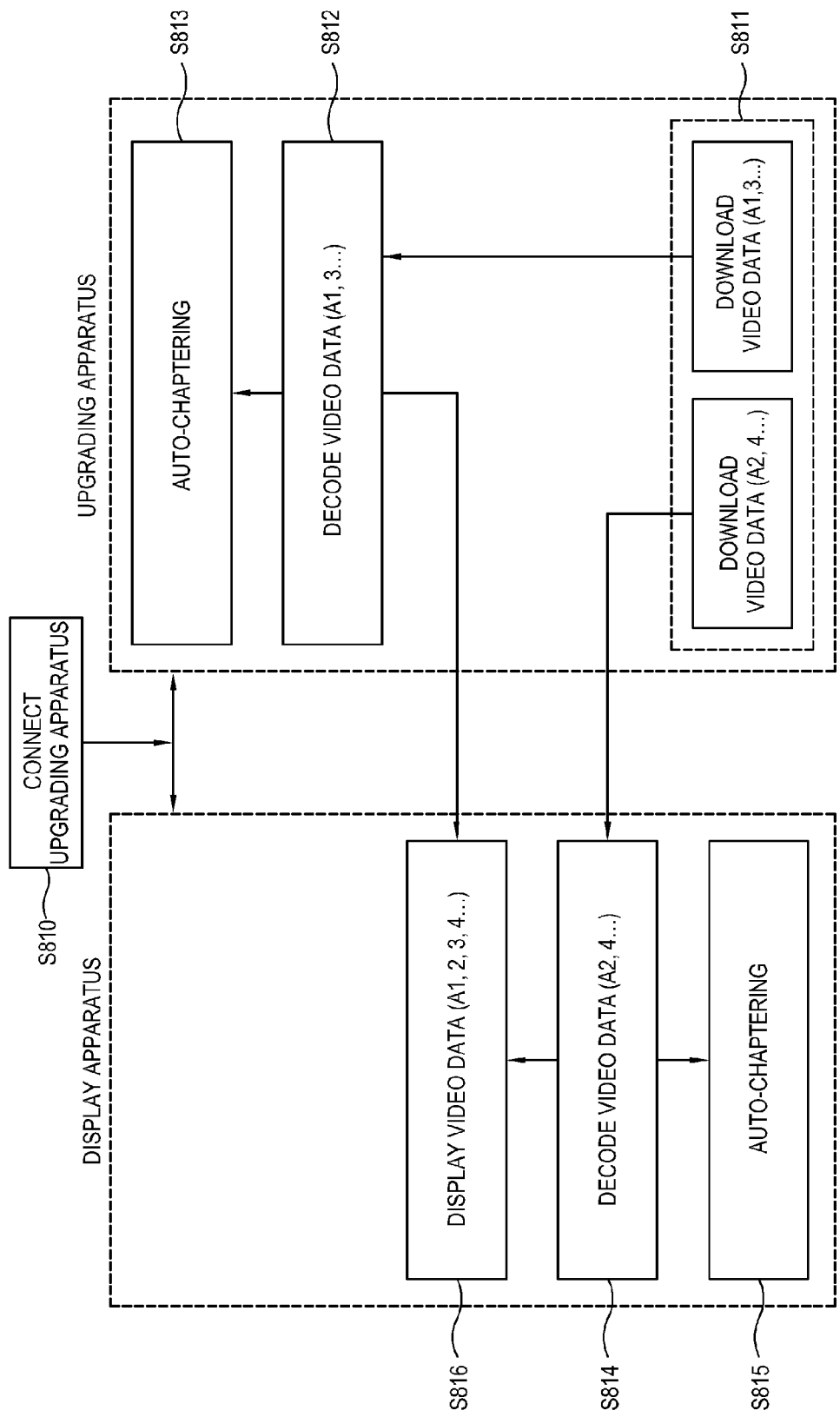

FIG. 11 illustrates a process of dividing and decoding downloaded video data of a streaming service by the display apparatus 100 and the upgrading apparatus 200 by using resources of the display apparatus 100 and the upgrading apparatus 200.

In FIG. 11, if the upgrading apparatus 200 is connected to the display apparatus 100 (S810), the upgrading apparatus 200 downloads video data A1, A2, A3, A4 . . . (S811). The upgrading apparatus 200 decodes a portion of the downloaded video data A1, A2, A3, A4 . . . , i.e., the downloaded video data A1, 3, . . . in the odd number section (S812). The upgrading apparatus 200 divides the decoded video data A1, 3, . . . in the odd number section into a plurality of chapters by index and may display the chapter information in the video data (S813).

The upgrading apparatus 200 transmits the video data A2, 4, . . . in the even number section to the display apparatus 100, and the display apparatus 100 decodes the received video data A2, in the even number section (S814). The transmitted video data may include at least one of a transport stream (TS) and an elementary stream (ES) format. The TS video data are processed by a de-multiplexer and decoded by a decoder of the upgrading apparatus 200. If the ES video data are transmitted, such data are transmitted to and decoded by the decoder.

The display apparatus 100 divides the decoded video data A2, 4, . . . in the even number section into a plurality of chapters by index, and may display chapter information in the video data (S815).

The display apparatus 100 combines the video data A1, in the odd number section decoded by the upgrading apparatus 200 and the video data A2, 4, . . . in the even number section decoded by the display apparatus 100 and outputs the combined video data to the display unit 140. The display apparatus 100 may perform the auto-chaptering function based on the chapter information of the video data A1, 3, . . . in the odd number section provided by the upgrading apparatus 200 and chapter information of the video data A2, 4, . . . in the even number section provided by the display apparatus 100.

The display apparatus 100 and the upgrading apparatus 200 may independently divide and decode single video data in a streaming service. According to the exemplary embodiment, even in a streaming service which does not support auto-chaptering during an encoding operation, the auto-chaptering function may be provided.

Figure 12:
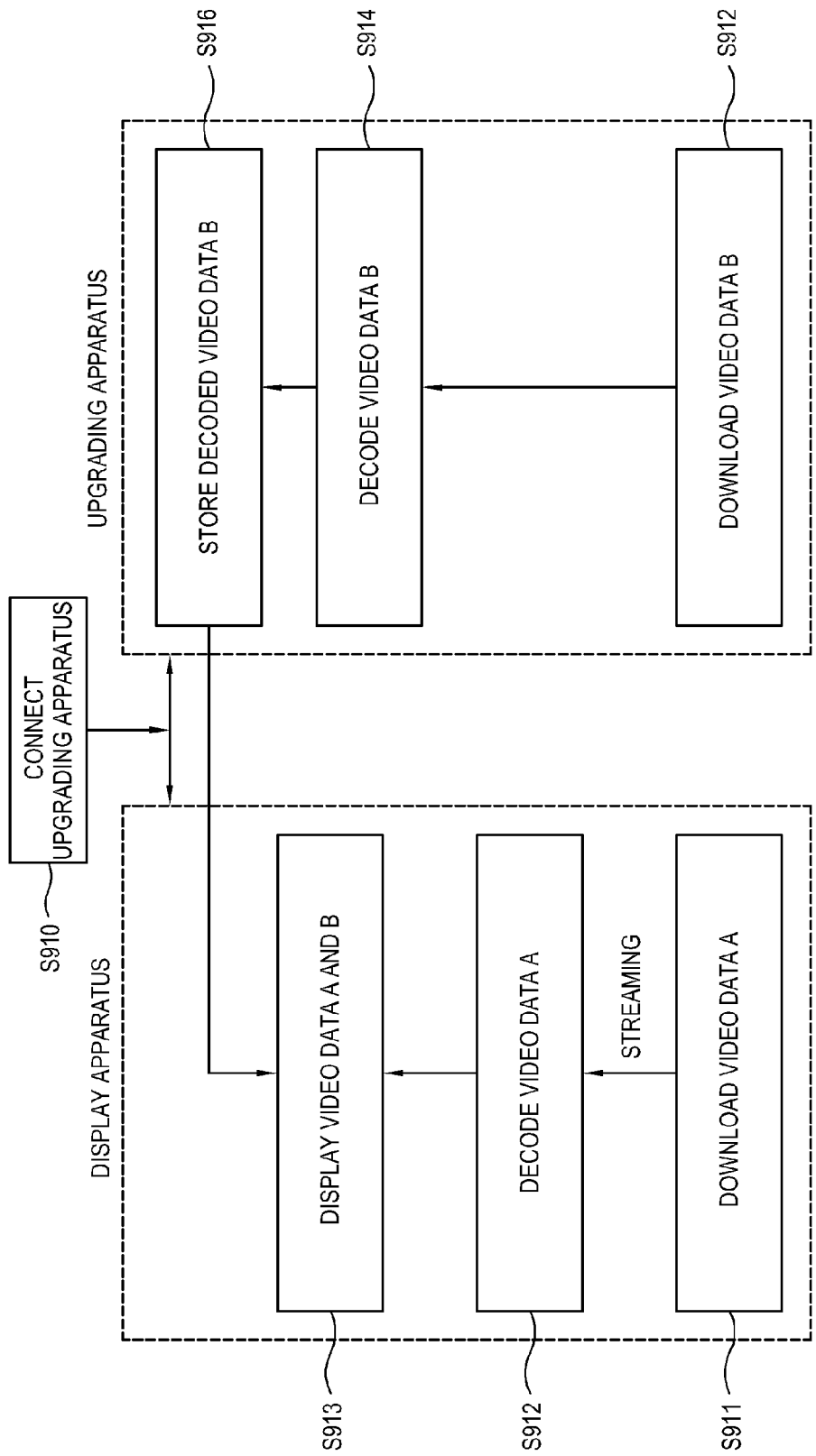

FIG. 12 illustrates a process of independently providing a streaming service of video data A and downloading/decoding of video data B by the display apparatus 100 and the upgrading apparatus 200 by using resources of the display apparatus 100 and the upgrading apparatus 200.

In FIG. 12, if the upgrading apparatus 200 is connected to the display apparatus 100 (S910), the display apparatus 100 downloads the streaming video data A in real-time (S911). The display apparatus 100 decodes the downloaded video data A (S912), and then displays the video data A on the display unit 140 (S913). While the display apparatus 100 downloads, decodes and displays the streaming video data A, the upgrading apparatus 200 downloads the video data B (S914). The upgrading apparatus 200 decodes the downloaded video data B (S915), and stores the decoded video data B in the second storage unit (270). If the output of the video data A of the display apparatus 100 is completed, the video data B stored in the second storage unit 270 of the upgrading apparatus 200 are transmitted to and output to the display apparatus 100.

On the contrary, the upgrading apparatus 200 may download, decode and display the streaming video data B, and at the same time, the display apparatus 100 may download and decode the video data A and store the video data A in the first storage unit 170.

While one of the display apparatus 100 and the upgrading apparatus 200 outputs the video data A(B) in a streaming, the other one of the display apparatus 100 and the upgrading apparatus 200 downloads/decodes/stores the video data B(A). As the video data B(A) may be played other than streamed, a user may efficiently play the video data.

Figure 13:
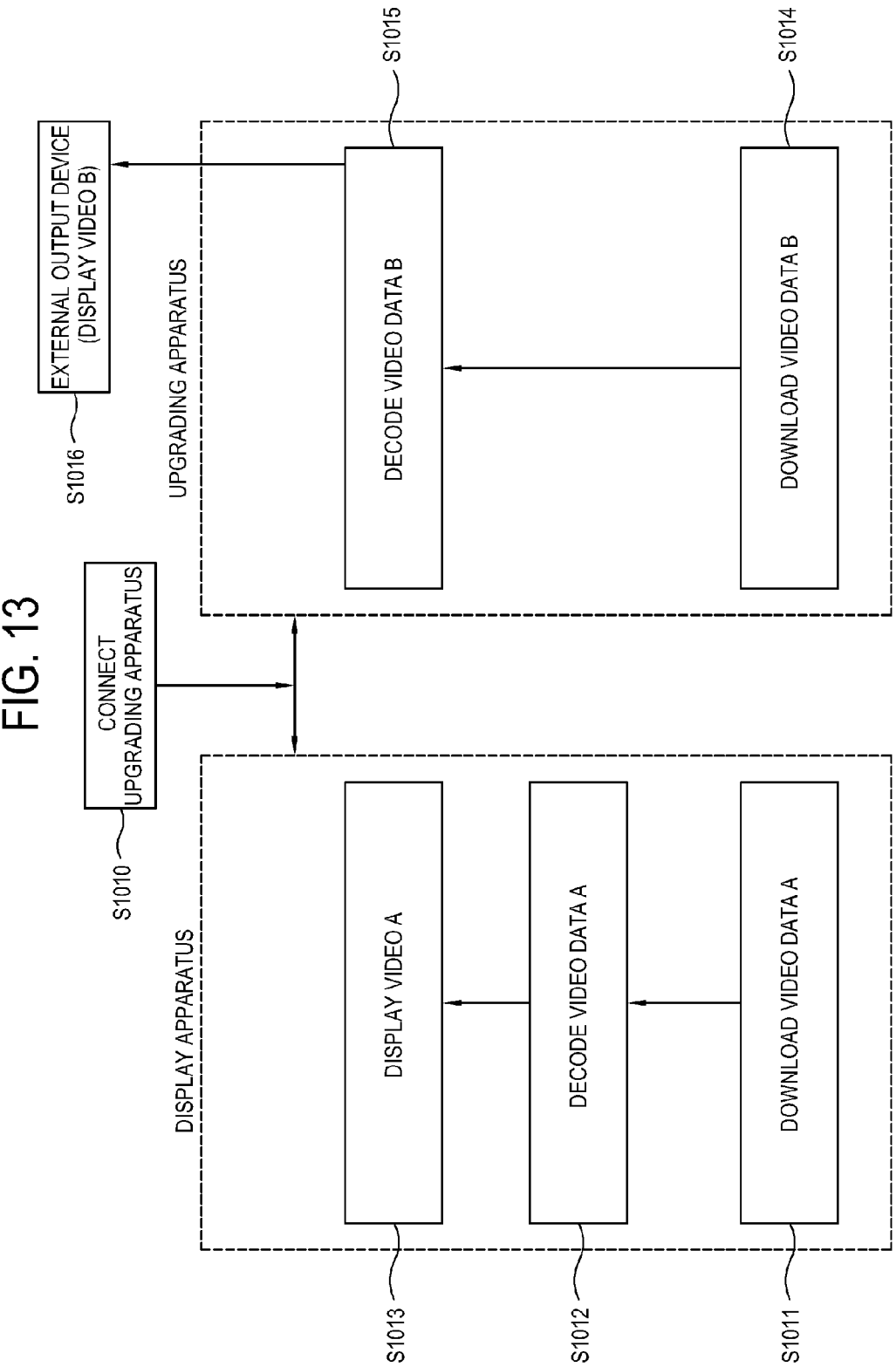

FIG. 13 is a flowchart of a data processing method for efficiently using resources of the display apparatus 100 and the upgrading apparatus 200 if an external output device such as a smart phone, a laptop computer, a PDA or a TV is connected to the second interface 216 of the upgrading apparatus 200.

In FIG. 13, if the upgrading apparatus 200 is connected to the display apparatus 100 (S1010), the display apparatus 100 downloads the video data A in real-time (S1011). The display apparatus 100 decodes the downloaded video data A (S1012), and then displays the decoded video data A on the display unit 140 (S1013). While the display apparatus 100 downloads, decodes and displays the video data A, the upgrading apparatus 200 downloads the video data B (S1014). The upgrading apparatus 200 decodes the downloaded video data B (S1015), and then transmits and outputs the video data B to the connected external output device (S1016).

In FIG. 13, the external output device is connected to the upgrading apparatus 200, but the external output device may be connected through the first interface 116 of the display apparatus 100 and the upgrading apparatus 200 may download and decode the video data B.

While the display apparatus 100 outputs the video data A via a streaming format, the upgrading apparatus 200 may download and decode the video data B and output the video data B through the connected external output device.

The display apparatus 100 may receive and transmit an image signal to the upgrading apparatus 200, and the second image processor 220 of the upgrading apparatus 200 may process the image signal and output the image signal through the external output device connected to the second interface 216.

In FIG. 13, the data processed by the display apparatus 100 are output through the display unit 140, and the data processed by the upgrading apparatus 200 are output through the connected external output device. However, the video data which are transmitted through the display apparatus 100 may be transmitted in at least one of TS and ES format to the upgrading apparatus 200, and decoded by the upgrading apparatus 200 and output to the external output device. If the data are processed as above, a resolution which may not be processed by the first image processor (decoder) of the display apparatus 100 may be processed by the second image processor (decoder) of the upgrading apparatus 200.

Figure 14:
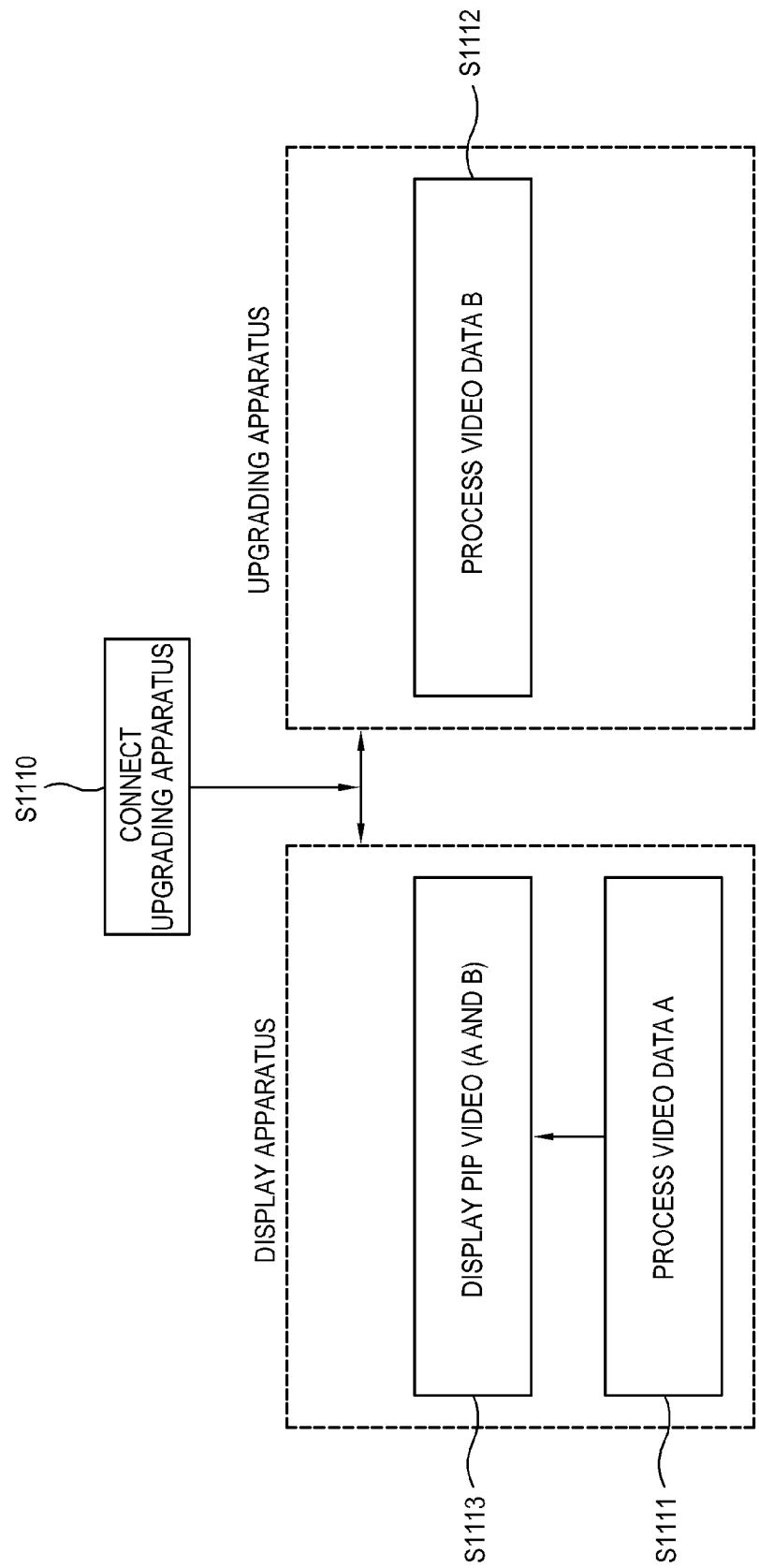

FIG. 14 illustrates a display method of a multi-screen, e.g., picture-in-picture (PIP) or picture-outside-picture (POP) which utilizes the display apparatus 100 and the upgrading apparatus 200 of the display system 1 according to an exemplary embodiment.

If the upgrading apparatus 200 is connected to the display apparatus 100 (S1110), the first controller 150 of the display apparatus 100 controls the first image processor 120 to display video data A as a main screen on the display unit 140. The first controller 150 transmits the processed video data A to the display unit 140 (S1111). The video data A are displayed as a main screen on the display unit 140 (S1113).

Figure 15:
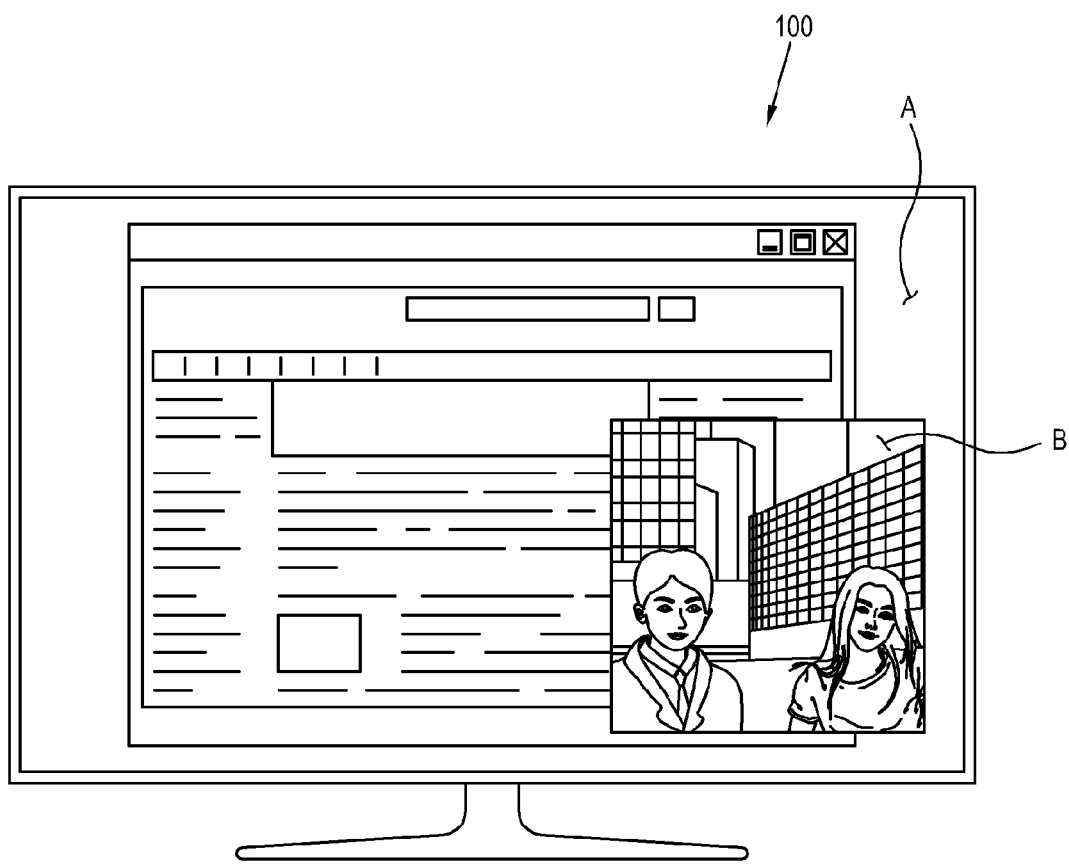
FIG. 15 illustrates a multi-screen according to an exemplary embodiment.

As shown in FIG. 15, the video data A are displayed as a main screen on the display unit 140. The video data A show a web browser connected to the Internet through the wired/wireless communication unit 118. This is an example only and various images which are processed by another image supply source or the first image processor 120 may be displayed as a main screen.

The second controller 250 controls the second image processor 220 of the upgrading apparatus 200 to display video data B as a sub-screen on the display unit 140. The second controller 250 transmits the video data B processed by the second image processor 220, to the display apparatus 100 (S1112). The transmitted video data B are transmitted to, and displayed as a sub-screen on, the display unit 140 of the display apparatus 100. As shown in FIG. 15, the video data B may be displayed as a sub-screen B which is smaller than the main screen A.

As the case may be, the first controller 150 and the second controller 250 may control the first image processor 120 and the second image processor 220 to display the video data B as a main screen and display the video data A as a sub-screen on the display unit 140.

Upon receiving a request through the first user input unit 175 or the second user input unit 275 of the upgrading apparatus 200 to display the video data A as a single entire screen on the display unit 140, the first controller 150 controls the first image processor 120 to output the video data A corresponding to the request. The video data B which are output by the second image processor 220 may not be transmitted to the display unit 140 and the data A may be output to the display unit 140. Then, the video data A are displayed as an entire screen on the display unit 140 and the video data B are not displayed. The video data B are not displayed on the display unit 140 but may be processed by the second image processor 220 in real-time. As the case may be, the first controller 150 may control the second controller 250 not to process the video data B by the second image processor 220.

On the contrary, upon receiving a request through the first user input unit 175 or the second user input unit 275 of the upgrading apparatus 200 to display the video data B as a single entire screen on the display unit 140, the second controller 250 controls the second image processor 220 to display the video data B as an entire screen corresponding to the request. The video data A which are processed by the first image processor 120 may not be transmitted to the display unit 140, but the video data B may be output to the display unit 140. Then, the video data B are displayed as an entire screen of the display unit 140 and the video data A are not displayed. The video data A are not displayed on the display unit 140 but the first controller 150 may control the first image processor 120 to process the video data A in real-time. As the case may be, the first controller 150 may control the first image processor 120 not to output the video data A.

The video data A and the video data B may be independently, simultaneously processed by the display apparatus 100 and the upgrading apparatus 200, and a multi-tasking may be performed efficiently.

As described above, according to an exemplary embodiment, not only data processing time is reduced but also upgrading information, application information and advertisement screen may be provided during an upgrading of a hub site.

When streaming, which does not provide an auto-chaptering function during an encoding of a video, the downloading and decoding operations are divided and performed by the display apparatus and the upgrading apparatus to thereby provide the auto-chaptering function.

According to an exemplary embodiment, the application related information may be displayed while the application is loaded for execution.

According to an exemplary embodiment, a display apparatus, an upgrading apparatus, a display system and a control method thereof which overcomes restrictions in using a decoder and provides upgraded functions may be provided.

According to an exemplary embodiment, in a PIP mode or POP mode displaying a plurality of screens on a single display unit, the display apparatus and the upgrading apparatus may divide and efficiently process a plurality of data processed in each screen.

Although a few exemplary embodiments have been shown and described, it will be appreciated by those skilled in the art that changes may be made in these exemplary embodiments without departing from the principles and spirit of the invention, the range of which is defined in the appended claims and their equivalents.

What is claimed is:

1. A display system comprising:
a display apparatus which comprises a first data processor to perform a first data processing, a display unit to output processed data, at least one first signal connector to transmit and receive data and a first controller to control the first data processor; and
an upgrading apparatus which comprises at least one second signal connector connected to the first signal connector to connect to the display apparatus, a second data processor to perform a second data processing, and a second controller to control the second data processor,
wherein the first data processor and the second data processor perform the data processing independently,
wherein the first controller controls the display unit to display a screen based on the processed signal received from the upgrading apparatus via the first signal connector, and
wherein the first controller controls to display a certain screen based on information received from the upgrading apparatus while the second controller controls the second data processor to upgrade a main user interface or load a program.

2. The display system according to claim 1, wherein the first and second signal connectors comprise at least one from among a high definition multimedia interface (HDMI), a universal serial bus (USB), a LOCAL AREA NETWORK (LAN), Wi-Fi and HDMI Ethernet Channel (HEC) interfaces.

3. The display system according to claim 1, wherein while the second controller loads a program, the first controller controls the first data processor to output information of the program through the output unit.

4. The display system according to claim 3, wherein if a loading time of the program exceeds a predetermined time, the first controller outputs information of the program through the display unit.

5. The display system according to claim 4, wherein the display apparatus receives an output command of information regarding the program from the upgrading apparatus through the at least one first signal connector and the at least one second signal connector.

6. The display system according to claim 3, wherein the information of the program comprises at least one from among program explanation information, program setting information, program version information and key guide information of the program.

7. The display system according to claim 1, wherein the first data processor and the second data processor divide and download single file data.

8. The display system according to claim 1, wherein the first data processor and the second data processor download different file data.

9. The display system according to claim 1, wherein one from among the first data processor and the second data processor performs image data downloading of a streaming service, and the other one of the first data processor and the second data processor performs decoding of the downloaded image data.

10. The display system according to claim 1, wherein the first data processor and the second data processor alternately perform image data downloading of a streaming service and decoding of the downloaded image data.

11. The display system according to claim 10, wherein while the downloaded image data are decoded, the data are divided into a plurality of chapters by index and the divided chapter information is shared between the first data processor and the second data processor.

12. The display system according to claim 11, wherein the shared chapter information is used as a basis for auto-chaptering image data.

13. The display system according to claim 1, wherein the first data processor and the second data processor divide and download video data during downloading of VIDEO ON DEMAND(VOD), and the first and second data processors share the divided, downloaded data.

14. The display system according to claim 1, wherein the first data processor and the second data processor divide and decode single data.

15. The display system according to claim 1, wherein the first data processor and the second data processor decode different data.

16. The display system according to claim 14, wherein the data which are decoded by the second data processor is transmitted by the display apparatus.

17. The display system according to claim 15, wherein the data which are decoded by the second data processor is transmitted by the display apparatus.

18. The display system according to claim 17, wherein the transmitted data comprise an image signal in at least one from among a transport stream (TS) format and an elementary stream (ES) format.

19. The display system according to claim 17, wherein the upgrading apparatus further comprises a de-multiplexer which de-multiplexes data transmitted by the display apparatus, wherein the data transmitted by the display apparatus comprise an image signal in a transport stream (TS) format.

20. The display system according to claim 19, wherein the upgrading apparatus further comprises a scaler which scales a decoded image signal.

21. The display system according to claim 15, wherein at least one from among the upgrading apparatus and the display apparatus further comprises an interface which is used to connect an external output device, and the data which are decoded by one from among the first data processor and the second data processor are output through the external output device connected to the interface.

22. The display system according to claim 1, wherein the data processed by the first data processor and the data processed by the second data processor are output independently, through the display unit.

23. The display system according to claim 22, wherein one from among the data processed by the first data processor and the data processed by the second data processor are displayed as a main screen of the display unit and the other one of the data are displayed as a sub screen of the display unit.

24. A data processing method of a display system comprising:
connecting a display apparatus and an upgrading apparatus through a signal connector;
performing a first data processing by a first data processor of the display apparatus;
performing a second data processing by a second data processor of the upgrading apparatus; and
controlling the first and second data processors by a first controller and a second controller respectively,
wherein the first controller controls a display unit to display a screen based on the processed signal received from the upgrading apparatus via the signal connector, and
wherein the first controller controls to display a certain screen based on information received from the upgrading apparatus while the second controller controls the second data processor to upgrade a main user interface or load a program.

25. The data processing method according to claim 24, wherein one from among the first data processing and the second data processing comprises loading a program and the other one of the first data processing and the second data processing comprises outputting information of the program through an output unit.

26. The data processing method according to claim 25, wherein if a loading time of the program exceeds a predetermined time, the display unit outputs information of the program.

27. The data processing method according to claim 26, further comprising transmitting an output command of information of the program by the upgrading apparatus connected through the signal connector, to the display apparatus.

28. The data processing method according to claim 24, wherein the first data processing and the second data processing comprise dividing and downloading single file data.

29. The data processing method according to claim 24, wherein the first data processing and the second data processing comprise downloading different file data.

30. The data processing method according to claim 24, wherein one from among the first data processing and the second data processing comprises downloading image data of a streaming service and the other one of the first data processing and the second data processing comprises decoding of the downloaded image data.

31. The data processing method according to claim 24, wherein the first data processing and the second data processing comprise alternately downloading image data of a streaming service and decoding of the downloaded image data.

32. The data processing method according to claim 31, wherein the first data processing and the second data processing comprise dividing the data into a plurality of chapters by index during a decoding of the downloaded image data and sharing the divided chapter information.

33. The data processing method according to claim 32, wherein the shared chapter information is used as a basis for auto-chaptering image data.

34. The data processing method according to claim 24, wherein the first data processing and the second data processing comprise dividing and downloading video data during a downloading of VIDEO ON DEMAND (VOD), and sharing the divided, downloaded data.

35. The data processing method according to claim 24, wherein the first data processing and the second data processing comprise dividing and decoding single data.

36. The data processing method according to claim 24, wherein the first data processing and the second data processing comprise decoding different data.

37. The data processing method according to claim 35, wherein the data which is decoded during the second data processing is transmitted by the display apparatus.

38. The data processing method according to claim 36, wherein the data which is decoded during the second data processing is transmitted by the display apparatus.

39. The data processing method according to claim 36, further comprising connecting an external output device to at least one from among the upgrading apparatus and the display apparatus; and outputting the decoded data through the connected external output device.

40. The data processing method according to claim 24, further comprising outputting the data of the first data processing and the data of the second data processing through the display unit.

41. The data processing method according to claim 40, wherein one from among the data of the first data processing and the data of the second data processing is displayed as a main screen of the display unit, and the other one from among the data of the first data processing and the data of the second data processing is displayed as a sub-screen of the display unit.

* * * * *